(12) United States Patent
Nakamura et al.

(10) Patent No.: US 6,874,411 B2
(45) Date of Patent: Apr. 5, 2005

(54) RECYCLE OF GRINDING SLUDGE

(75) Inventors: Kanji Nakamura, Iwata (JP); Yasuyuki Yamada, Iwata (JP); Tetsuo Suzuki, Iwata (JP); Katsuhiro Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 299 days.

(21) Appl. No.: 09/838,340

(22) Filed: Apr. 20, 2001

(65) Prior Publication Data

US 2001/0050006 A1 Dec. 13, 2001

(30) Foreign Application Priority Data

| Apr. 28, 2000 | (JP) | 2000-129311 |
|---|---|---|
| Apr. 28, 2000 | (JP) | 2000-129312 |
| Apr. 28, 2000 | (JP) | 2000-129313 |
| Apr. 28, 2000 | (JP) | 2000-129314 |
| Apr. 28, 2000 | (JP) | 2000-129315 |

(51) Int. Cl.$^7$ ................................................. B30B 7/04
(52) U.S. Cl. ........................ 100/37; 100/42; 100/50; 100/215; 100/226; 100/229 R; 100/232; 100/906
(58) Field of Search ........................ 100/903, 906, 100/232, 215, 35, 37, 106, 226, 229 R, 110, 126–129, 42, 48, 50, 51, 290; 425/149, 412, 419; 264/86, 120

(56) References Cited

U.S. PATENT DOCUMENTS

| 3,980,014 A | * | 9/1976 | McEwen et al. ............ 100/127 |
| RE29,606 E | * | 4/1978 | Eliot ........................... 100/92 |
| 4,557,190 A | * | 12/1985 | Vezzani ..................... 100/98 R |
| 4,665,817 A |   | 5/1987 | Simpson |
| 5,307,739 A |   | 5/1994 | Gourdol |
| 5,391,069 A | * | 2/1995 | Bendzick .................... 100/126 |
| 5,445,789 A |   | 8/1995 | Wanetzky et al. |
| 5,544,194 A |   | 8/1996 | Hugo et al. |
| 6,279,471 B1 | * | 8/2001 | Reddoch ....................... 100/37 |

FOREIGN PATENT DOCUMENTS

| DE | 31 50 641 A1 | 6/1930 |
| DE | 42 40 668 C1 | 1/1994 |
| DE | 198 12 459 A1 | 10/1998 |
| EP | 0 468 853 A1 | 1/1992 |
| EP | 0 629 717 A2 | 6/1994 |

* cited by examiner

*Primary Examiner*—Allen Ostrager
*Assistant Examiner*—Jimmy T Nguyen
(74) *Attorney, Agent, or Firm*—Staas & Halsey LLP

(57) ABSTRACT

A method of and an apparatus for compressing the grinding sludge, which is effective to compress the grinding sludge to provide an intended rigid briquette even though the grinding sludge contains ground chips of hardened iron and/or steel materials and an oil-based coolant and also to facilitate reuse of the briquette (B1) as material for production of steel. The grinding sludge containing the oil-based coolant and hardened component parts such as steel component parts that are used in bearings is compressed. To this end, the grinding sludge produced from a grinding line (1) is filtered by a filtering unit (4) to provide a concentrated sludge which is subsequently compressed by squeezing by a briquetting machine (5) to provide the briquette (B1). The briquette B1 so obtained can be reused as steel material. The coolant separated from the grinding sludge during filtering and squeezing is returned to the grinding line (1) through recovery passages (7, 8).

34 Claims, 11 Drawing Sheets

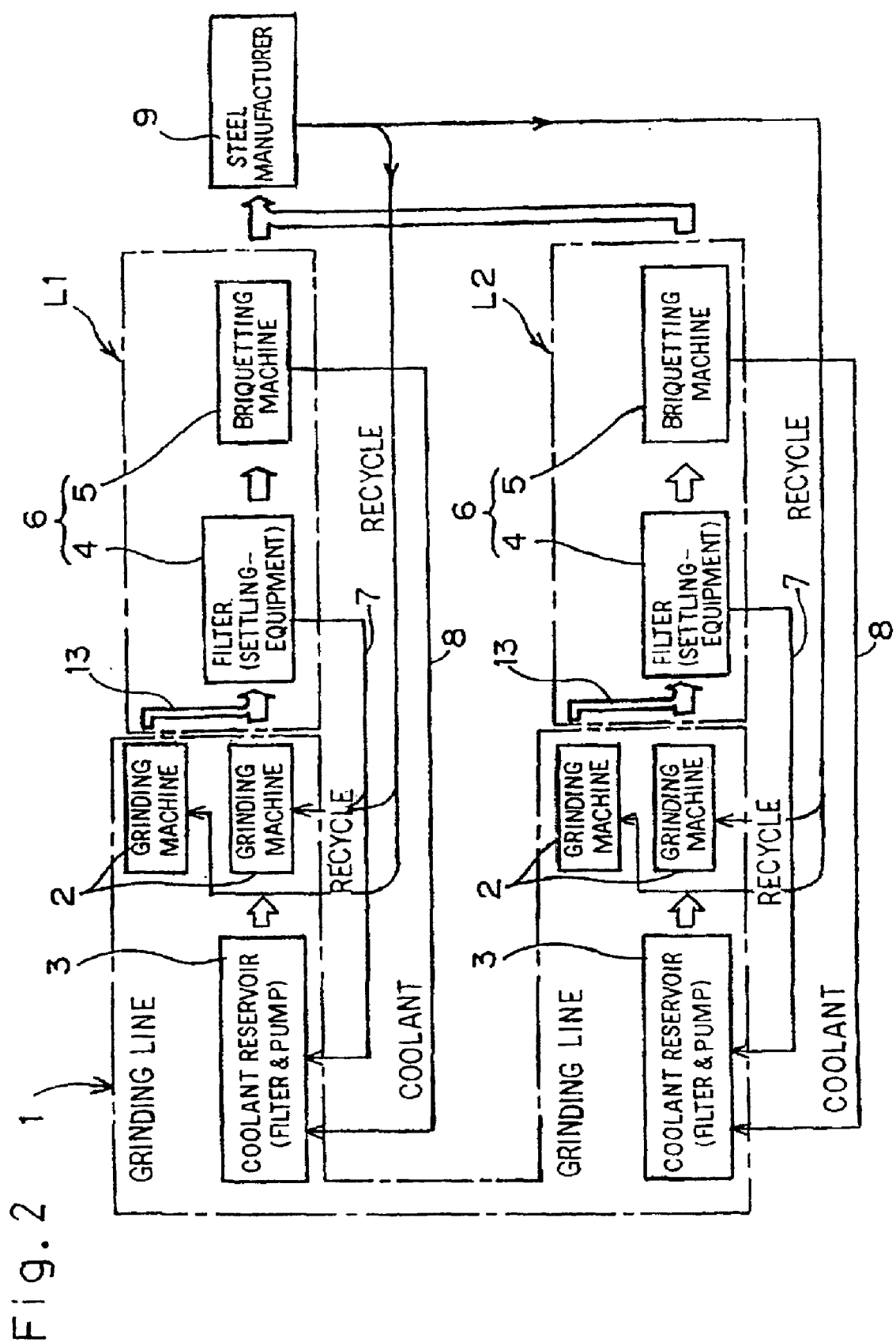

RECYCLE OF GRINDING SLUDGE

BACKGROUND OF THE INVENTION

1. Field of the Invention

The present invention generally relates to recycling of metal-containing sludge and, more particularly, to a method of and an apparatus for realizing a recycle of a grinding sludge by compressing a grinding sludge of hardened component parts produced in a grinding line, for example, ferrous component parts of rolling bearings such as inner and outer races and rolling elements or any other grinding sludge, to thereby form a compressed material (hereinafter referred to as a "briquette") and also to the compressed material and a recycling system therefore.

2. Description of the Prior Art

Ferrous component parts of rolling bearings such as inner and outer races and rolling elements are, after having been hardened, subjected to a grinding process to grind raceways and others. Powdery grinding scraps or ground chips produced as a result of the grinding are discharged as a sludge together with a coolant to the outside of the system and are then filtered so that the coolant can be reused. The grinding sludge left as a result of the filtration is in most cases buried in landfill.

FIG. 19 illustrates a block diagram showing the flow of the process. The grinding scraps produced by a grinding machine 101 is fed together with a coolant through a piping and is then filtered by a filtering means such as a filter or a settling equipment 102, with the filtered coolant being returned by a pump by way of a filter back to a coolant reservoir 103 from which the coolant is supplied to the grinding machine 101. The grinding sludge left after filtration still contains a quantity of the coolant, wherefore it cannot be reused and, hence, is disposed by an industrial waste material disposing industry as, for example, land filling.

Although the amount of the grinding scraps produced as a result of the grinding is relatively small as compared with the amount of cutting scraps, a mass-production line for manufacture of, for example, bearings results in a relatively large quantity of the grinding scraps and, not only is the burying of the grinding sludge in landfill generally considered undesirable from the standpoint of environmental pollution, but also it is obvious that in view of the waste treatment sites reaching an dead end, the grinding sludge would no longer be buried in landfill.

Under these circumstances, it has been suggested to compress the grinding sludge by squeezing to provide a compressed material (referred hereinafter to as a "briquette") so that the coolant squeezed therefrom can be reused while the briquette can be used as a material for steel production.

The grinding sludge using a water-based coolant can easily be compressed to provide the briquette and, in fact, a compressing machine therefore is being sold in the market.

Unfortunately, an oil-based coolant has a higher viscosity than that of the water-based coolant and, therefore, the grinding sludge using the oil-based coolant provides various problems in compressing it. By way of example, during squeezing the oil-based coolant is difficult to be drained and even though the pressure used during squeezing is increased, compression of the grinding sludge to a required strength cannot be achieved. For this reason, compression of the grinding sludge containing the oil-based coolant has not yet been practiced.

In a grinding line in which in the course of manufacture of rolled steel plates, grinding is carried out to remove flaws appearing on surfaces of metal plates, it has been suggested to filter a grinding sludge and then compress it by squeezing to thereby recover a compressed material as a briquette so that the briquette can be reused as material for production of the rolled steel plates. The grinding sludge produced as a result of grinding of the rolled steel plates contains grinding scraps that are so soft and pliable as to allow the grinding sludge to be easily compressed. Also, the grinding sludge so produced has a relatively small quantity of coolant, allowing such grinding sludge to be easily compressed.

In contract, in the case of the grinding sludge produced from hardened component parts, the grinding sludge is hard and difficult to turn into a solid. For this reason, the grinding sludge from the hardened component parts have to be strongly compressed. Unfortunately, the grinding sludge containing the oil-based coolant as hereinbefore described is more difficult to be turned into a solid since difficulty is often encountered in draining the coolant during squeezing. Also, in the case of the grinding sludge from the hardened component parts, since a few tens of milliliter per minute of the coolant is used for grinding, for example, 1 to 2 grams of steel, the proportion of the coolant in the grinding sludge is relatively high and, considering that a major portion of the grinding sludge is occupied by the coolant, such grinding sludge is hard to be turned into a solid.

The briquette formed by compressing a grinding powder and the briquette formed by compressing the grinding sludge containing the water-based coolant, both hitherto available, generally represents a cylindrical shape as shown in FIG. 18. However, in order for the oil-based coolant having a relatively high viscosity to be efficiently squeezed, it is considered feasible to increase the inner and outer circumferences of the briquette B without the applied surface pressure during a press work being reduced. The use of a drain passage for drainage of an oil component or a pressure valve in a punch for squeezing the grinding sludge has been suggested, but there is a high risk of the sludge clogging in the drain passage or the pressure valve and, therefore, the suggested use of the drain passage and the valve is not practical.

SUMMARY OF THE INVENTION

Accordingly, an important object of the present invention is to provide a method of compressing the grinding sludge, which is effective to compress the grinding sludge to provide an intended rigid briquette even though the grinding sludge contains grinding scraps of hardened iron and/or steel materials and an oil-based coolant and also to facilitate reuse of the briquette.

Another important object of the present invention is to provide an apparatus for compressing the grinding sludge, which is effective to efficiently compress the grinding sludge to provide an intended rigid briquette hard to break up even though the grinding sludge contains grinding scraps of hardened iron component parts and an oil-based coolant.

A further important object of the present invention is to provide a method of treating the grinding sludge, which is effective to compress the grinding sludge even though the grinding sludge is produced in a grinding line in which hardened component parts are ground, to facilitate the reuse thereof as well as the coolant resulting from the processing, and also to provide a recycling system including such treating apparatus.

The method of compressing the grinding sludge to make a compressed solid material according to the present invention is such as to compress the grinding sludge containing an oil-based coolant, which grinding sludge contains grinding scraps produced as a result of grinding hardened steel material for bearings, wherein the grinding sludge is filtered to provide a concentrated sludge that is subsequently compressed by squeezing.

According to the above described compressing method, since the grinding sludge is filtered to provide the concentrated sludge which is subsequently compressed by squeezing, a load during squeezing is minimized and compression is possible even though the grinding sludge contains the oil-based coolant used with the hardened iron and/or steel materials. In other words, even though the grinding sludge is of a kind in which the grinding scraps are hard and fine and are required to be compressed and in which because of the oil-based coolant the coolant is difficult to be squeezed, compression can be accomplished satisfactorily. Also, since the grinding sludge produced as a result of grinding of steel material used for bearings is employed, the resultant briquette is a solid aggregation of grinding scraps of steel material used for bearings which is a high quality steel material and, therefore, is of a high quality. For this reason, the briquette can be reused as a material for production of steel material.

In one embodiment of the present invention, the grinding sludge before being filtered is a fluid medium containing the coolant in a quantity equal to or greater than 90 wt %. While grinding of the hardened component parts made of steel material for bearings results in a grinding sludge made up of grinding scraps of the hardened component parts and a relatively large quantity of coolant, compression by squeezing is possible by filtering the grinding sludge to provide the concentrated sludge.

Preferably, the compressed solid material formed by the compressing step contains the coolant in a quantity within the range of 5 to 10 wt %. While the compressed solid material, that is, the briquette is preferred to have a relatively small quantity of coolant that is an impurity so that it can be reused as a material for production of steel, squeezing would be difficult to achieve and the efficiency of compression would be lowered if the amount of the coolant contained in the compressed solid material is smaller than 5 wt %. Also, it would be difficult to provide the compressed solid material that is hard enough not to break up while it is handled if the amount of the coolant contained in the compressed solid material is greater than 10 wt %.

In another preferred embodiment of the present invention, during the filtering step, the grinding sludge is preferably guided towards a filtering belt and then filtered under pressure by utilization of a compressed air.

Filtration by the use of the filtering belt can effectively facilitate subsequent dewatering by means of an air blow technique to result in a high dewatering of the sludge. Also, the sludge deposited on the filter belt can concurrently serves as a filter and, therefore, the filtering belt can have a prolonged lifetime together with a high filtering efficiency. Moreover, the concentrated sludge deposited on the filtering belt subsequent to filtration can easily be removed by scraping from the filtering belt as the filtering belt is moved.

The concentrated sludge so formed represents grinding scraps of a shape similar to the shape of a curled fiber mingled together and satisfies important conditions required to facilitate compression.

Where a plurality of kinds of the coolants are used in a grinding line, the filtering step and the compressing steps are preferably performed for each kind of the coolants in a paralleling fashion.

Independent treatment for each kind of the coolants is effective to avoid a possible mix-up of the different kinds of the coolants resulting from the filtration and squeeze and, therefore, the coolants can easily be treated for reuse. Also, treatment conditions such as pressure applied during squeezing and the length of time required to finish squeezing can be set up for each kind of the coolant to thereby facilitate compression.

The steel material used as a material for the bearings may be component parts of a rolling bearing such as, for example, inner and outer races and rolling elements.

It is well known that in a process of grinding the component parts of rolling bearings, the oil-based coolant is frequently used and the grinding scraps produced are generally so hard and so fine that compression is difficult to achieve. However, the grinding scraps are high quality steel material used for the rolling bearings. Also, considering that the bearings are generally mass-produced, the resultant grinding sludge is generally uniform in composition. For these reasons, when such a grinding sludge is compressed, the compressed solid material, that is, the briquette having a high quality sufficient to be used as a material for production of steel can be obtained. Conditions required to be set up for squeezing can easily be set up to facilitate the compression.

According to one aspect of the present invention, there is provided an apparatus for making a compressed solid material by compressing the grinding sludge containing an oil-based coolant, which sludge is a grinding sludge resulting from a hardened steel material used as a material for bearings. This compressing apparatus preferably includes a filtering means for filtering the grinding sludge to provide a concentrated sludge, and a compressing means for compressing the concentrated sludge by squeezing to thereby provide a compressed solid material. With this compressing apparatus, even though the grinding sludge contain the oil-based coolant in combination with the grinding scraps of the hardened component parts made of iron or steel, compression thereof can easily be achieved to provide the briquette that can be used as a high quality steel material for reuse.

According to another aspect of the present invention, there is provided an apparatus for making a compressed solid material by compressing a grinding sludge containing a coolant, which sludge is produced in a grinding line for grinding hardened component parts, by filtering the grinding sludge to provide a concentrated sludge which is subsequently compressed by squeezing to provide a compressed solid material. This compressing apparatus includes a primary press unit for accommodating a predetermined quantity of the concentrated sludge and pre-compressing the concentrated sludge that has been accommodated, and a secondary press unit for compressing the pre-compressed sludge under a predetermined pressure to thereby provide the compressed solid material.

With this compressing apparatus, since the use is made of the primary compressing unit for pre-compressing the concentrated grinding sludge after having been filtered, which is subsequently squeezed and compressed by the secondary press unit to provide the compressed solid material, that is, the briquette, the grinding sludge even though produced as a result of grinding the hardened component parts and are difficult to be compressed because of the resultant grinding scraps being hard and very fine can be compressed. In other words, squeezing of the grinding sludge cannot be achieved quickly even though the pressure is increased because of the viscosity of the coolant and fine interstices among the grinding scraps contained in the grinding sludge and it is therefore considered difficult to sufficiently reduce the quantity of the coolant. However, pre-compression followed by compression such as performed in the present invention as hereinabove described is effective to allow squeezing conditions to be properly set up for each stage of squeezing so that the quantity of the coolant contained in the grinding sludge can be sufficiently reduced to such an extent that it can be squeezed, resulting in efficient and effective squeezing to be achieved. Also, the primary and secondary press units can be run parallel to each other and, therefore, a highly efficient squeezing is possible. For this reason, even though the grinding sludge is that of the hardened component parts that are considered difficult to be compressed, and even though the grinding sludge contains the oil-based coolant, compressing can be achieved efficiently to provide the rigid compressed solid material hard to break up.

In the compressing apparatus according to the second mentioned aspect of the present invention, the primary press unit may be a vertical press having a primary compressing chamber in which the concentrated sludge is pre-compressed in a downward direction and includes a shutter defined at a lower end thereof for discharge of the pre-compressed sludge. In this case, the secondary press unit is preferably a transverse press including a secondary compressing chamber having a portion positioned immediately below the shutter for receiving the pre-compressed sludge by way of the shutter. The coolant used therewith may be an oil-based coolant.

With this compressing apparatus, the predetermined amount of the grinding sludge supplied to the primary press unit while the shutter is closed can be pre-compressed within the primary press unit. The pre-compressed sludge is then delivered onto the secondary press unit through the shutter and is compressed by squeezing to provide the compressed solid material. In this case, since the primary press unit is a vertical press, the space occupied by the primary press unit may be small and the supply of the pre-compressed sludge onto the secondary press unit can be easily achieved merely by allowing the pre-compressed sludge to fall by gravity through the shutter. Also, since the secondary press unit is a transverse type lying perpendicular to the primary press unit, the coolant squeezed out from the grinding sludge can be drained laterally outwardly without stagnating around the sludge being squeezed. For this reason, the coolant so drained can easily be discharged to thereby facilitate compression by squeezing more efficiently.

Preferably, the compressing apparatus according to the second mentioned aspect of the present invention is provided with a sludge supply unit positioned above the primary press unit for supplying the concentrated sludge into the primary compressing chamber. This sludge supply unit is preferably a vertical type sludge supply unit including a hopper through which the concentrated sludge is allowed to fall by gravity into the primary compressing chamber through a sludge receiving port of the primary press unit positioned below the hopper.

The use of the vertical type sludge supply unit allow the sludge to be smoothly supplied with a compact structure.

Similarly, the compressing apparatus according to the second mentioned aspect of the present invention preferably includes a heating means for heating and maintaining the primary press unit to and at a predetermined temperature range.

The viscosity of the coolant contained in the grinding sludge is lower at a temperature higher than normal temperatures. Accordingly, if the concentrated sludge within the primary press unit is heated to and maintained at an elevated temperature by the heating means, the coolant can easily be squeezed, thereby reducing the length of time required to complete a press process. Since in the secondary press unit the pre-compressed sludge which has been heated in the primary press unit is supplied, squeezing is possible at a high temperature even though no heating means is employed in the secondary press unit. Since the primary press unit requires the pressure lower than that required in the secondary press unit and may have a simplified structure, the heating means can easily be installed. For this reason, the provision of the heating means in the primary press unit allows the sludge to be compressed at an elevated temperature not only in the primary press unit, but also in the secondary press unit with a simplified structure.

In one preferred embodiment of the present invention, the compressing apparatus according to the second mentioned aspect of the present invention preferably includes a press control means for controlling a pressure used for squeezing in the secondary press unit to a predetermined pressure and a predetermined compressing speed. During the process taking place in the secondary press unit for compressing to provide the compressed solid material, a relatively large pressure is required and, because of the viscosity of the coolant and the fine interstices among the grinding scraps, the pressure applied and the compressing speed considerably affect the squeezing efficiency and the finish. For this reason, the use of the press control means is effective to manufacture the rigid compressed solid material of a desired composition in a reduced time even though the grinding sludge contains the oil-based coolant of a high viscosity.

The compressing apparatus according to the second mentioned aspect of the present invention, the secondary press unit preferably has a discharge port defined therein for discharge of the compressed solid material, and further comprising a transport path following the discharge port. In this case, the transport path is divided into two paths. A sorting means is also provided for selectively switching the compressed solid material, discharged form the discharge port, onto one of the two paths.

The division of the transport path following the discharge port into the two paths in combination with the use of the sorting means is effective to separately transport the acceptable compressed solid materials and the rejected compressed solid materials.

Where the transport path is divided into the two paths, the use is preferred of a pressure sensor provided in the secondary press unit and a sorting control means so that the sorting control means can control a switching operation of the sorting means by comparing a pressure detected by the pressure sensor with a threshold value.

Even when the sludge is compressed by the secondary press unit to a predetermined volume or capacity, and in the event that the squeezing pressure has not yet attained a predetermined value, the resultant compressed solid material will not be sufficiently compressed and lacks a sufficient strength. Accordingly, the pressure sensor provided in the secondary press unit is effective to allow the sorting operation to be performed according to the detected pressure, thereby achieving an efficient sorting of the compressed solid material. Therefore, only the acceptable compressed solid materials can be transported through the predetermined path without being mixed with the rejected compressed solid materials.

In accordance with a third aspect of the present invention, there is provided an apparatus for making a compressed solid material by compressing a grinding sludge containing a coolant, which sludge is produced in a grinding line for grinding hardened component parts, by filtering the grinding sludge to provide a concentrated sludge which is subsequently compressed by squeezing to provide a compressed solid material. This compressing apparatus includes a primary press unit for accommodating a predetermined quantity of the concentrated sludge and pre-compressing the concentrated sludge that has been accommodated, and a heating means for heating and maintaining the concentrated sludge within the primary press unit to and at a predetermined temperature range.

With the compressing apparatus according to the third mentioned aspect of the present invention, not only can the squeezing be facilitated during a subsequent process step since the concentrated grinding sludge after having been filtered is pre-compressed by the primary press unit, but the coolant has its viscosity reduced advantageously to facilitate the squeezing of the coolant during squeezing since the heating means is employed in the primary press unit for heating to and maintaining the concentrated sludge within a predetermined temperature range.

In other words, squeezing of the grinding sludge cannot be achieved quickly even though the pressure is increased because of the viscosity of the coolant and fine interstices among the grinding scraps contained in the grinding sludge and it is therefore considered difficult to sufficiently reduce the quantity of the coolant. However, pre-compression followed by compression such as performed in the present invention as hereinabove described is effective to allow squeezing conditions to be properly set up for each stage of squeezing so that the quantity of the coolant contained in the grinding sludge can be sufficiently reduced to such an extent that it can be squeezed, resulting in efficient and effective squeezing to be achieved.

Also, the viscosity of the coolant contained in the grinding sludge is lower at a temperature higher than normal temperatures. Accordingly, if the concentrated sludge within the primary press unit is heated to and maintained at an elevated temperature by the heating means, the coolant can easily be squeezed, thereby reducing the length of time required to complete a press process. The use of the heating means is also effective to reduce the content of the oil-based coolant remaining in the compressed solid material. In particular, in the case with the grinding sludge containing the oil-based coolant of a high viscosity, the use of the heating means is effective to reduce the viscosity of the coolant considerably down to a value comparable with, for example, the viscosity of a water-based coolant, thereby enhancing an effect of improvement in squeezing. Since during the subsequent squeezing process, only the concentrated sludge that has been pre-compressed in the primary press unit is supplied to the secondary press unit, the squeezing can be performed at an elevated temperature without any heating means employed in the secondary press unit. Provision of such heating means is effective particularly in low temperature environment such as in winter season.

Because of these features discussed above, even though the grinding sludge is that of the hardened component parts and hard to be compressed because of hard and fine natures thereof, and even though the grinding sludge is that containing the oil-based coolant, it can be satisfactorily compressed. Also, compression can be achieved efficiently to provide the compressed solid material hard to break up.

In one preferred embodiment, the heating means may include a heater installed in the primary press unit.

The heater may be embedded in a wall of a vessel of the primary press unit within which the grinding sludge is pre-compressed or may be disposed on an outer periphery thereof. The use of the heater for the heating means makes it possible to simplify the heating means.

Alternatively or in combination therewith, the heating means may include a hot air blower for blowing a hot air to the primary press unit.

Preferably, the predetermined temperature range to and at which the concentrated sludge within the primary press unit is heated and maintained is from 20 to 60° C.

While the coolant contained in the grinding sludge has its viscosity lowered when the temperature is high, excessive heating involves a risk of firing of the oil-based coolant and, therefore, the upper limit of the temperature to which the grinding sludge is heated should be about 60° C. If the temperature is lower than 20° C. that is close to normal temperatures, reduction of the viscosity brought about by heating will be insufficient.

The coolant is preferably oil-based and of a paraffin type. The paraffin type coolant is stable in nature and easy to handle.

In the compressing apparatus according to the third mentioned aspect of the present invention, the primary press unit is preferably a vertical press having a primary compressing chamber within which the sludge is downwardly compressed.

Where the primary press unit is of a vertical press design, the space occupied by the primary press unit can be reduced. Also, the sludge pre-compressed in the primary press unit can be delivered from a lower end thereof onto the subsequent stage and, therefore, transportation of the pre-compressed sludge can be facilitated.

In accordance with a fourth aspect of the present invention, there is provided an apparatus for compressing a grinding sludge containing a coolant, which sludge is produced in a grinding line for grinding hardened component parts, by filtering the grinding sludge to provide a concentrated sludge which is subsequently compressed by squeezing to provide a compressed solid material. This apparatus include a press unit having a compressing chamber defined therein for compressing the concentrated sludge within the compressing chamber to thereby provide the compressed solid material, and a press control means for controlling a pressing work used for squeezing to a predetermined pressure and a predetermined compressing speed.

During the process taking place to compress the grinding sludge by squeezing, a relatively large pressure is required and, because of the viscosity of the coolant and the fine interstices among the grinding scraps, the pressure applied and the compressing speed considerably affect the squeezing efficiency and the finish. The viscosity of the coolant significantly affects the dischargeability of the coolant after the grinding sludge has bleeded, and/or on the path through which it is discharged through a gap in the press unit. Because of these reasons, the use is made of the press control means to control the pressure used in squeezing to a predetermined pressure and a predetermined compressing speed so that the compressed solid material containing a desired quantity of the coolant and a required strength can be manufactured in a reduced length of time even though the grinding sludge has contained the oil-based coolant of a high viscosity.

Preferably, the press control means is operable to retain the pressure for a predetermined time when the pressure applied attains a target pressure. More specifically, when the pressure attains the target value, the pressure will not be reduced immediately thereafter but is maintained for a predetermined time. The predetermined time during which the pressure is maintained is preferably equal to or longer than 10 seconds.

Maintenance of the pressure is effective to facilitate an efficient compression in coordination with a delay in bleeding of the coolant from the compressed solid material and, therefore, the rigid compressed solid material hard to break up and containing a desired content of the coolant can be manufactured efficiently.

In a preferred embodiment of the present invention, the press control means repeatedly performs an operation to retain the predetermined pressure for the predetermined length of time a number of times during a period in which the pressure used during squeezing is progressively increased. The predetermined length of time during which the pressure is retained during such pressure increase process is preferably within the range of 2 to 3 seconds.

Because of the viscosity of the coolant, bleeding of the coolant from the sludge being compressed tends to delay relative to the compressing operation. Particularly in the case of the oil-based coolant having a high viscosity, a considerable delay occurs in bleeding. For this reason, during the course in which the pressure is progressively increased, by repeating retention of the pressure for the predetermined time and increase of the pressure, the viscous coolant can be effectively and efficiently squeezed while being compressed, without the concentrated sludge, which has been conditioned to be easily compressed with curly grinding scraps entangled together, being decomposed into a slurry. The briquette so produced can exhibit a low content of the coolant.

The press control means is preferably of a type capable of slowly reducing the compressing speed. Because of the viscosity of the coolant, bleeding of the coolant becomes difficult as the compression proceeds. For this reason, the coolant can be efficiently bleeded by slowly reducing the compressing speed.

Preferably, the press control means is of a type capable of applying the pressure for squeezing which is equal to or lower than 400 MPa.

A result of experiments has shown that if the pressure used during the squeezing is higher than 400 MPa, neither reduction in content of the coolant in the compressed solid material nor increase of the strength thereof is expected and that the proper coolant content and sufficient strength of the compressed solid material can be obtained when the pressure is 400 MPa.

In the compressing apparatus according to the fourth mentioned aspect of the present invention, the press unit is of a type capable of driving a pressing member by means of a ball screw mechanism driven by an electric motor.

Although a drive source for the press unit may be a hydraulic press, the hydraulic press has a problem in that the efficiency thereof is low because of a heat loss and there is a difficulty in controlling it. In contrast thereto, the use of the electric motor in combination with the ball screw mechanism can provide a desired control line with the compressed solid material consequently manufactured efficiently.

The present invention also provides a compressed solid material prepared by compressing a grinding sludge containing a coolant, which sludge is produced in a grinding line for grinding hardened component parts, by squeezing, said compressed solid material being of a hollow cylindrical shape having a hollow defined therein.

With the compressed solid material of the structure described above, the presence of the cylindrical hollow a therein is effective, as compared with the solid cylindrical column briquette, to provide increased inner and outer circumferences with no need to increase the cross sectional surface area thereof which would affect a surface pressure during compression, thereby facilitating squeezing of the coolant during the manufacture using the compression process. In particular, the inner and outer circumferences thereof can be increased even though the cross sectional surface area thereof remains the same. For this reason, even with the grinding sludge containing the oil-based coolant, it can easily be compressed by squeezing and, even without a drainage passage used, the coolant can be drained efficiently. Also, even with the grinding sludge of hard and fine grinding scraps resulting from a hardened component part, the coolant can easily be squeezed and, therefore, the compression can easily be achieved. Because of these features, the briquette robust and hard to break up can be obtained. The hollow in the briquette is preferably cylindrical.

Preferably, the hollow defined in the compressed solid material extends completely across the length of the compressed solid material with its opposite ends opening outwardly through respective end faces thereof. Where the compressed solid material is in the form of a hollow cylindrical shape having the hollow defined therein in the form of a throughhole, the inner and outer circumferences thereof which serve as a discharge surface area for the coolant can advantageously be increased. For this reason, as compared with the solid cylindrical shape, for a given quantity of the grinding sludge or a given volume of the compressed solid material, the gap through which the coolant can flow out can be increased without the surface pressure reduced, thereby facilitating compression of the grinding sludge.

Where the compressed solid material is of the hollow cylindrical shape discussed above, the ratio of an inner diameter D2 of the cylindrical hollow relative to an outer diameter D1 of the compressed solid material is preferably D2/D1=0.40 to 0.60.

The greater the ratio, the greater the surface area. However, in order to maintain the same volume the outer diameter D1 increases and such increase of the outer diameter of the compressed solid material poses a problem associated with increase in size of the compressing apparatus. Also, increase of the outer diameter of the compressed solid material is accompanied by an increase of the inner diameter D2 resulting in reduction in wall thickness of the compressed solid material as measured between the outer and inner peripheral surfaces thereof and if this ratio exceeds 0.60, the wall thickness is excessively small with the compressed solid material being consequently susceptible to breakage. On the other hand, if the ratio is small, a sufficient effect brought about by increase of the surface area will not be obtained, whereas if the ratio is smaller than 0.4, no effectiveness to facilitate squeezing of the coolant which ought to be brought about by the formation of the hollow in the compressed solid material will be obtained.

The coolant in the compressed solid material may be an oil-based coolant, in which case the amount of said oil-based coolant is preferably within the range of 5 to 10 wt %.

When the compressed solid material is to be reused as material for production of steel, the smaller the quantity of the coolant which is an impurity, the better. However, if the content of the coolant is smaller than 5 wt %, the squeezing would be difficult to achieve, resulting in insufficient squeezing efficiency. On the other hand, if the content of the coolant is larger than 10 wt %, reuse as material for production of steel is difficult and the strength would also be insufficient.

In a preferred embodiment, the hardened component parts are ferrous component parts of a rolling bearing such as, for example, inner and outer races and rolling elements. Making the compressed solid material out of grinding sludge of such component parts has the advantages mentioned before.

The present invention also provides a grinding sludge recycling method for recycling a compressed solid material of the grinding sludge as a material for steel production, said recycling method comprising filtering the grinding sludge, produced in a grinding line for grinding hardened component parts, to provide a concentrated sludge which is subsequently compressed by squeezing to thereby provide the compressed solid material while a coolant separated from the grinding sludge during filtering and compressing processes is returned to the grinding line. The hardened component parts referred to above although preferred to be steel material for bearings, may be any material other than the steel material for bearings.

According to the recycling method, as is the case with the compressing method, the grinding sludge can be compressed. The resultant compressed solid material can be reused as material for production of steel and the coolant produced as a result of the treatment process can also be reused. Accordingly, the limited natural resource can be effectively utilized and any possible environmental pollution can be minimized.

In the practice of the recycling method of the present invention, where a plurality of kinds of coolants are used in the grinding line, a plurality of processing lines are preferably distributed depending on the kinds of the coolants used. In this case, each of said processing lines includes means for performing the filtration, means for compressing by squeezing, a transport path for transporting the grinding sludge from the grinding line to the filtering means, and coolant recovery passages for returning the associated coolant from the filtering means and the compressing means back to the grinding line.

Treatment of the coolants separately according to the kinds thereof facilitates compression and the coolant can easily be reused, as has been described in connection with the compressing method of the present invention.

The present invention further provides a grinding sludge recycling system for recycling a grinding sludge produced in a grinding line for grinding hardened component parts. The recycling system includes a transport means for transporting the grinding sludge, a filtering means for filtering the grinding sludge so transported to thereby provide a concentrated sludge, a compressing means for compressing by squeezing the concentrated sludge to thereby provide a compressed solid material, and coolant recovery passages for returning a coolant separated from the grinding sludge during filtering and compressing processes back to the grinding line.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is a block diagram showing the use of a plurality of the compressed solid material making machines and the sludge treating methods arranged in parallel sequences;

DETAILED DESCRIPTION OF THE EMBODIMENTS

Figure 1A:
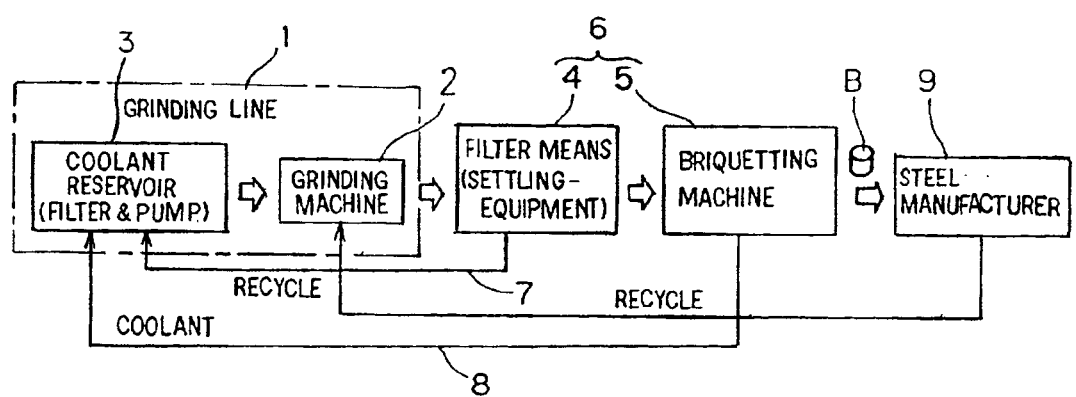
FIG. 1A is a block diagram showing a conceptual construction of a compressed solid material making apparatus and a method of treating a metal-containing sludge according to a first preferred embodiment of the present invention.

A first preferred embodiment of the present invention will now be described with reference to the accompanying drawings. In FIG. 1A at a machining line 1, machining is performed by a grinding machine 2 with the use of a coolant supplied from a coolant reservoir 3. A grinding sludge containing the coolant and ground chips produced as a result of the machining performed by the grinding machine 2 is filtered by a filtering means 4, and a concentrated sludge produced as a result of the filtration is subsequently squeezed by a briquetting machine 5, which is a compressing means, to produce a briquette (a compressed solid material) B. The filtering means 4 and the briquetting machine 5 constitutes compressing apparatus 6. The coolant produced after the grinding sludge has been filtered by the filtering means 4 and the coolant produced as a result of squeezing performed by the briquetting machine 5 are returned to the coolant reservoir 3 of the machining line 1 by way of respective recovery passages 7 and 8. From the recovery passages 7 and 8, the coolant is returned to the coolant reservoir 3 by means of a filter and a pump.

Figure 1B:
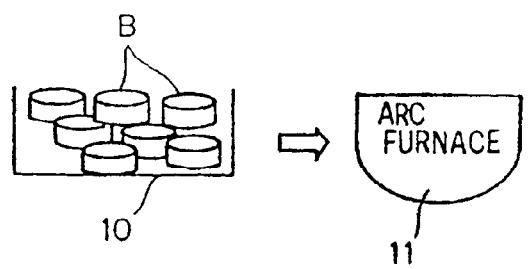
FIG. 1B is an explanatory diagram showing a process step to be taken after the sludge has been briquetted.

Also, from the coolant reservoir 3, the coolant is supplied to the grinding machine 2 through a filter and a pump. The briquettes B compressed by the briquetting machine 5 are transported to a steel manufacturer 9 who subsequently utilizes the briquettes B as a material for steel products. Transportation of the briquettes B is carried out by a truck or any other suitable transport vehicle after having been filled in transport containers 10 as shown in FIG. 1B. The steel manufacturer 9 utilizes the briquettes B as a material for steel products using an arc furnace 11 or the like. The steel product so manufactured by the steel manufacturer 9 is used as a raw material of an article to be ground.

The article to be ground at the machining 1 is a hardened component such as a steel material for bearings such as bearing steels. By way of example, the hardened component referred to above may be a ferrous component part of a rolling bearing and, more particularly, may be raceways such as inner and outer races and/or rolling elements such as balls. The coolant used in conjunction with the grinding is employed in the form of an oil-based coolant or a water-based coolant. The steel material for bearings may include a sheerly hardened material such as, for example, high-carbon chromium containing steel (SUJ2 and so on), a high frequency hardened material such as, for example, a medium carbon steel (S53C and so on) and a carburization hardened material such as, for example, case-hardened steel (SCR 415 and so on).

The grinding sludge produced when the article to be ground is ground by the grinding machine 2 is a fluid medium containing 90 wt % or more of the coolant, the balance being powdery ground chips and a small quantity of particles of a grindstone. The ground chips are of a generally curled slender shape. The grinding sludge after having been filtered by the filtering means 4 to produce the concentrated sludge contains generally half the amount of the coolant used. The composition of the concentrated sludge is, for example, about 50 wt % of the ground chips of bearing steel or the like, about 50 wt % of the coolant and a small quantity of the grindstone particles.

The composition of the briquette B is steel, most of which is ground chips, 5 to 10 wt % of the coolant and a small quantity of grindstone particles remaining after most of the composition has been drained together with the coolant during a compression process. If the ground chips are high quality steel such as bearing steel or the like even though the briquette B contains a small quantity of the grindstone particles, the reuse of it as a material for production of steel poses no problem. The briquette B has a predetermined strength, for example, such a strength that when the briquette B is fallen onto a surface from a height of, for example, 1 meter, the number of debris of the briquette B does not exceed three. It is, however, to be noted no binder (such as cut chips) for binding the ground chips together is mixed in the briquette B at all.

Where a plurality of coolants of different kinds are used in the machining line 1, a plurality of, for example, two, processing lines L1 and L2 shown in FIG. 2 are distributed depending on the kinds of the coolants used. In other words, the use is made of the processing lines L1 and L2 each including the filtering means 4, the compressing means (briquetting machine 5), a transport path 13 through which the grinding sludge is transported from the corresponding machining line 1 to the filtering means 4 and the coolant recovery passages 7 and 8. Although the two processing lines L1 and L2 are shown in FIG. 2, the number of the processing lines depends on the number of kinds of the coolants used. The machining line 1 referred to in this specification is not always limited to a single machining line, but may mean an aggregation of individual machining lines and, accordingly, may include all of the grinding machines installed in one plant or may be an aggregation of individual machining lines for each work unit within the plant. The use of the plural processing lines L1 and L2 is effective to avoid meeting of different kinds of grinding sludge containing different kinds of coolants for filtration and/or compression processes.

The processing lines may be divided into any suitable number of processing lines depending on the types of steel of the articles to be ground, in addition to division thereof depending on the kinds of the coolants.

Figure 3:
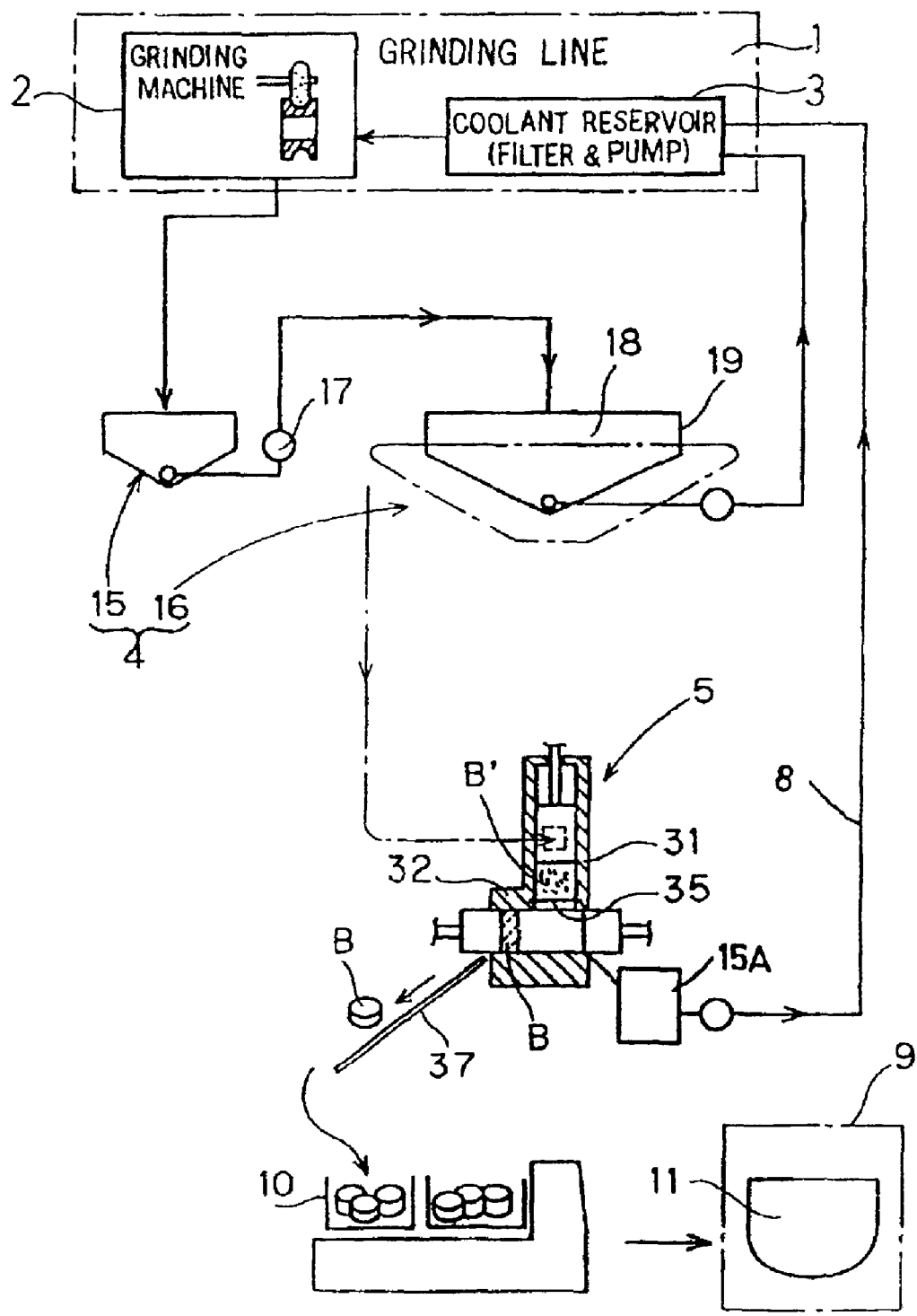
FIG. 3 is a schematic diagram showing the compressed solid material making apparatus and the sludge treating method.

As shown in FIG. 3, the filtering means 4 includes a settling equipment 15 and a filtering equipment 16. The grinding sludge produced in the machining line 1 is first introduced into the settling equipment 15 whereat the grinding sludge is settled, and is subsequently guided by a pump 17 to the filtering equipment 16 whereat the grinding sludge is again filtered. The settling equipment 15 may include, for example, a cylindrical tank having its bottom shaped to represent a downwardly converging conical shape and is of a design in which the grinding sludge is introduced into the cylindrical settling tank in a direction tangential to the cylindrical settling tank. Tangential introduction of the grinding sludge into the settling equipment 15 allows the grinding sludge to be agitated in an eddy current to thereby distribute the ground chips uniformly in the coolant.

The filtering equipment 16 makes use of a filtering belt 18 and is used in the form of a pressure type belt filter in which the grinding sludge can be filtered by the effect of a pressure of a compressed air.

The recovery passage 8 extending from the briquetting machine 5 to the coolant reservoir 3 includes a settling equipment 15A for recovering the coolant that has been filtered. It is, however, to be noted that in place of the settling equipment 15A, a filtering means for filtering the coolant in a different manner may be employed.

Figure 4:
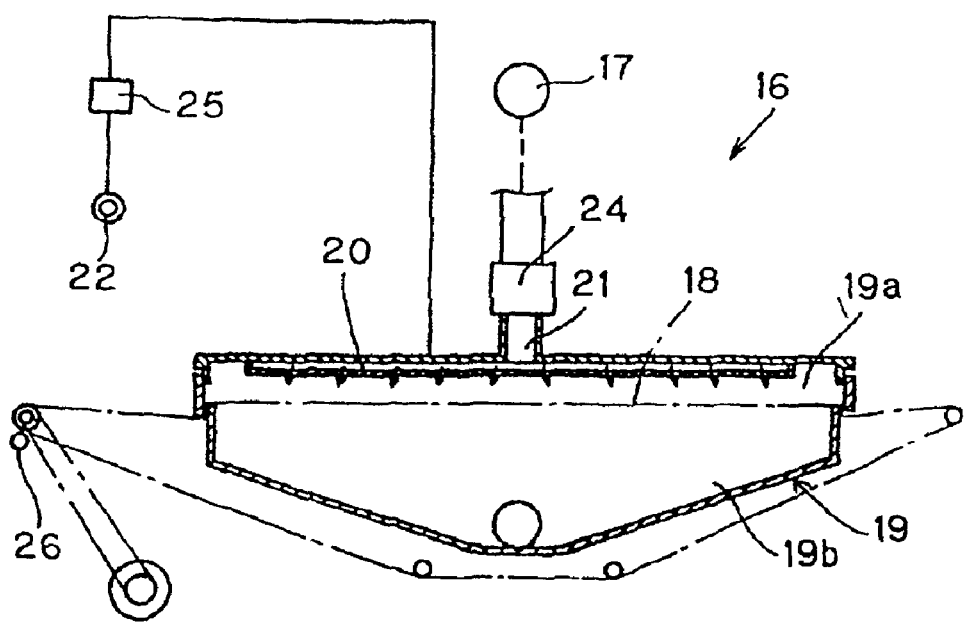
FIG. 4 is a sectional view showing a filtering means used in the compressed solid material making apparatus.

FIG. 4 illustrates an example of the filtering equipment 16 including the pressure-type belt filter. This filtering equipment 16 is of a structure in which the interior of a vessel 19 is divided into an upper pressure chamber 19a and a lower chamber 19b by a horizontal run of the endless filtering belt 18. The filtering belt 18 is trained around a plurality of pulleys so as to travel along a predetermined path with its horizontal run extending through the interior of the vessel 19. The pressure chamber 19a is provided with a grinding sludge inlet 21 through a dispenser 20 and is communicated with a compressed air supply source 22.

The grinding sludge to be filtered is pumped under pressure by the pump 17 so as to be introduced into the pressure chamber 19a uniformly through the dispenser 20 by way of an inflow valve 24. The coolant contained in the grinding sludge so introduced under pressure passes through the sludge, deposited on the filtering belt 18, and the filtering belt 18. The coolant substantially purified as it passes through the deposited sludge on the filtering belt 18 and the filtering belt 18 is subsequently removed from the lower chamber 19b and returned to the machining line 1.

After the predetermined filtering process, the supply of the grinding sludge is interrupted and an air blow valve 25 is opened to allow the compressed air to be introduced into the pressure chamber 19a. The compressed air so supplied is used to urge the coolant remaining within the pressure chamber 19a into the lower chamber 19b through the deposited sludge and then to blow the coolant, then sticking to the deposited sludge, off from the deposited sludge. After the air blow with the compressed air, the pressure chamber 19a is released to equalize to the atmospheric pressure, the pressure chamber 19a is opened. In this condition, the filtering belt 18 is moved so that the sludge resting on the filtering belt 18 can be scraped off and removed therefrom by a scraper 26 at a location outside the vessel 19.

The sludge so removed is the concentrated sludge, half of which is occupied by the coolant as hereinbefore described and is subsequently transported to a subsequent processing station where the briquetting machine 5 is installed.

The pressurized filtration utilizing the filtering belt 18 is effective to facilitate dewatering of the sludge by means of the air blow to a high dewatering rate. The effect of the sludge deposited on the filtering belt 18 acting as a filter effectively works out and, accordingly, not only can the filtering belt 18 have an increased lifetime, but also the filtering accuracy is high.

Figure 5:
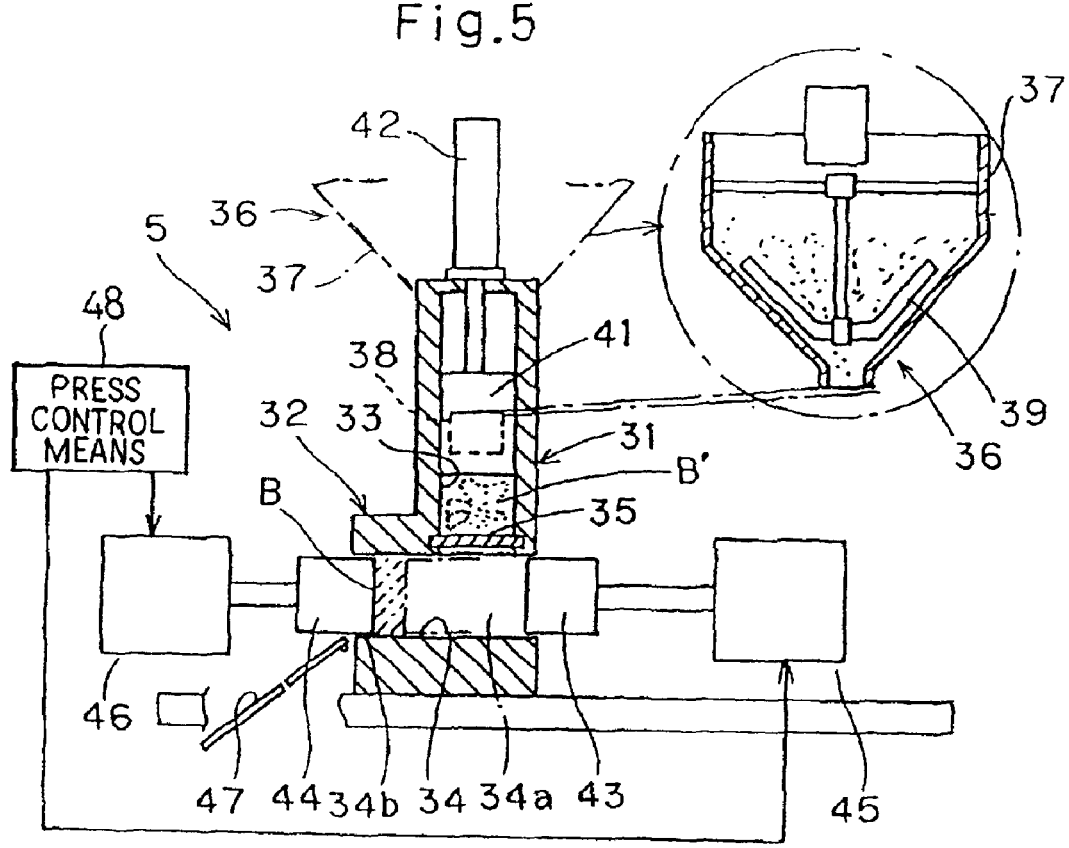
FIG. 5 is a sectional view of a briquette making machine used in the compressed solid material making apparatus.
Figure 6:
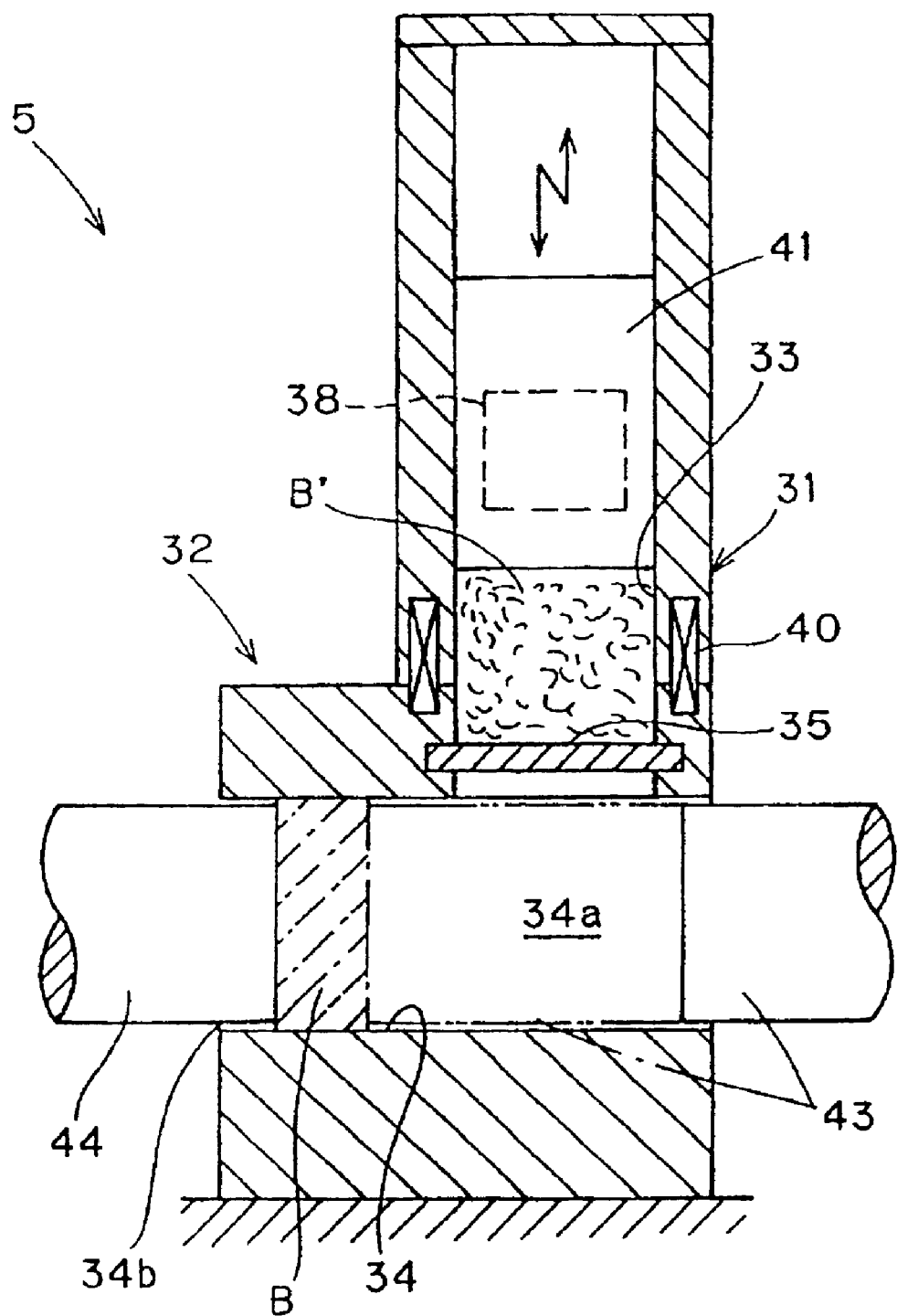
FIG. 6 is a fragmentary sectional view, on an enlarged scale, showing the briquetting machine.

As shown in FIGS. 5 and 6, the briquetting machine 5 includes a primary press unit 31 for accommodating a predetermined quantity of the concentrated sludge and pre-squeezing the concentrated sludge, and a secondary press unit 32 for squeezing the pre-squeezed sludge by the application of a predetermined pressure to thereby compress it to provide a compressed solid material.

The primary press unit 31 is in the form of a vertical press including a generally cylindrical primary compressing chamber 33, a piston-like pressing member 41 for downwardly pre-compressing the sludge accommodated within the primary compressing chamber 33, and a shutter 35 installed at a bottom end of the primary compressing chamber 33 for discharging the sludge which has been pre-compressed. The pressing member 41 is adapted to be driven by a press drive source 42 such as, for example, a hydraulic cylinder between lifted and lowered positions within the primary compressing chamber 33. A sludge intake port 38 is defined in a side surface of the primary compressing chamber 33.

The secondary press unit 32 is in the form of a transverse press including a generally cylindrical secondary compressing chamber 34 and piston-like pressing members 43 and 44 movable horizontally for pressing the pre-compressed sludge B' within the secondary compressing chamber 34. One of opposite ends of the secondary compressing chamber 34 in a direction conforming to a direction of compressing is positioned immediately below the shutter 35 and opens to define a receiving port 34a for receiving the pre-compressed sludge B' by way of the shutter 35, whereas the other of the opposite ends of the secondary compressing chamber 34 opens to define a briquette discharge port 34b which is in turn communicated with a briquette transport path 47 for transporting briquettes B. The briquette transport path 47 may be defined by a chute or the like. Each of the pressing members 43 and 44 is drivingly connected with a respective press drive source 45 or 46, which may be a hydraulic cylinder or the like. Of the pressing members 43 and 44, the pressing member 43 is a movable working member capable of being advanced towards the advanced position adjacent the pressing member 44 to apply a pressure to the pre-compressed sludge B to compress the latter. The pressing member 44 is a plug member that is held at a closing position to close the briquette discharge port 34b during compression of the pre-compressed sludge B performed by the pressing member 43, but is retracted towards an open position to open the briquette discharge port 34b at the time the briquette B is to be discharged onto the briquette transport path 47.

A sludge supply unit 36 from which the concentrated sludge is supplied to the primary press unit 31 is in the form of a vertical sludge dumping structure including a hopper 37 having its bottom defining a sludge outlet port that is communicated with the sludge intake port 38 so that the concentrated sludge can be supplied from the hopper 37 into the primary compressing chamber 33 by way of the sludge intake port 38 under the effect of a gravitational force. The hopper 37 includes a stirrer 39 operatively disposed within the interior thereof for stirring the sludge inside the hopper 37 and also for urging the sludge towards an outlet port at the bottom of the hopper 37. It is to be noted that the sludge supply unit 36 is disposed above the primary press unit 31 as shown by the single-dotted line in FIG. 5 and the details thereof are shown on an enlarged scale in the circle drawn therein.

The press drive sources 45 and 46 of the secondary press unit 32 are adapted to be controlled by a press control means 48 to apply a controlled pressure to the sludge at a controlled compressing speed.

The primary press unit 31 has a built-in heating means 40 (See FIG. 6) for heating the grinding sludge within the primary compressing chamber 33 to a predetermined temperature and maintaining the grinding sludge at that predetermined temperature. This heating means 40 may be an electric heater, a hot-air blower, or a recirculating passage through which a heating medium flows.

The operation of the briquetting machine 5 of the structure described above will now be described. While the shutter 35 is closed, a predetermined quantity of the concentrated sludge is supplied from the hopper 37 into the primary compressing unit 31 and the machine is then held in a wait condition until the concentrated sludge within the primary compressing unit 31 is heated to a predetermined temperature. When the concentrated sludge within the primary compressing unit 31 is heated by the heating means 40 to a predetermined temperature range, the pressing member 41 is lowered to perform a pre-compression of the concentrated sludge within the primary compressing unit 31.

The pre-compressed sludge B' within the primary compressing unit 31 is, after the shutter 35 has been opened, supplied into the receiving port 34a at that end of the secondary compressing unit 32. The supply of the pre-compressed sludge B' into the secondary compressing unit 32 takes place by the effect of a gravitational force, but may be accomplished forcibly by lowering the pressing member 41 of the primary compressing unit 31. The pre-compressed sludge B' so supplied into the secondary compressing unit 32 is compressed within the secondary compressing chamber 34 by the pressing members 43 and 44 from opposite directions close towards each other to thereby form a briquette B. The compression taking place within the secondary compressing chamber 34 is carried out by the utilization of a predetermined pressure and a predetermined compressing speed.

The briquette B so formed is discharged from the briquette discharge port 34b onto the briquette transport path 47

(FIG. 5) by retracting the plug-type pressing member 44 towards the opened position and, on the other hand, advancing the pressing member 43 further towards the advanced position.

Figure 7:
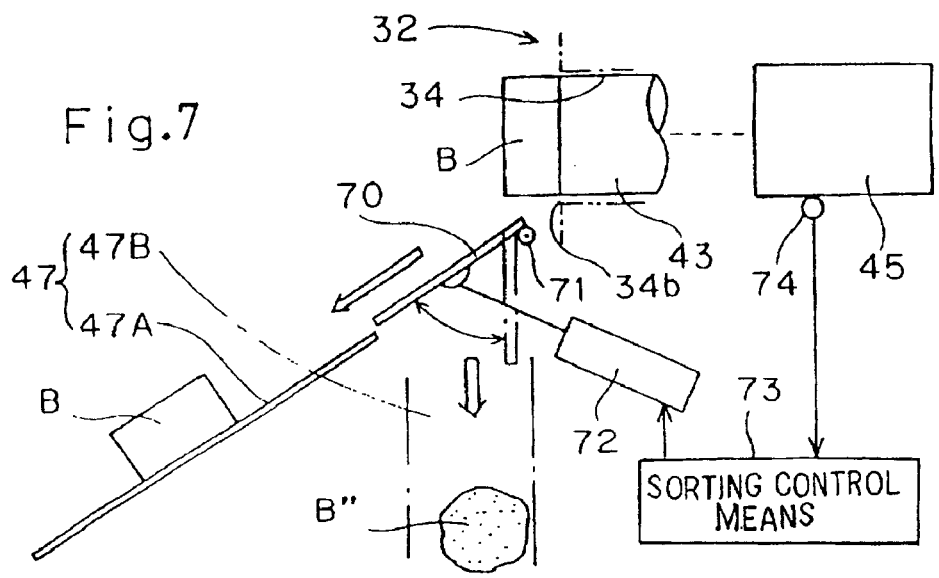
FIG. 7 is a schematic diagram showing a transport passage and a sorting means both employed in the briquetting machine.

The briquette transport path 47 communicated with the briquette discharge port 34b of the secondary press unit 32 is, as shown in FIG. 7, bifurcated into first and second branch passages 47A and 47B, there being provided a sorting means 70 for directing the briquette B, discharged from the briquette discharge port 34b, selectively into the first and second branch passages 47A and 47B. The first branch passage 47A is for successive transportation of briquettes B that are deemed acceptable and is comprised of a chute. The sorting means 70 includes a pivotally supported slide interposed between the briquette discharge port 34b and an upstream end of the first branch passage 47A and is pivotable between closed and opened positions about a pivot axis 71. The sorting means 70 comprised of the pivotally supported slide extends slantwise to connect the briquette discharge port 34b with the first branch passage 47A when held in the closed position, but extends downwardly as shown by the phantom line in FIG. 7 to disconnect the briquette discharge port 34b from the first branch passage 47A when held in the opened position. On the other hand, the second branch passage 47B is for successive ejection of briquettes B" that are deemed rejected and is comprised of a down-fall passage opening downwardly from the briquette discharge port 34b. The sorting means 70 is drivingly connected with a drive source 72 that is electrically or mechanically connected with a sorting control means 73 for ultimately controlling the sorting operation (i.e., open/close drive) of the sorting means 70.

The sorting control means 73 controls the sorting operation of the sorting means 70 based on a result of comparison of a pressure, detected by a pressure sensor 74 provided in operative association with the press drive source 45 of the secondary press unit 32, with a predetermined threshold value. By way of example, if the detected pressure is equal to or higher than the threshold value, the sorting control means 73 causes the sorting means 70 to the closed position with the briquette discharge port 34b consequently connected with the first branch passage 47A therethrough, but when the detected pressure is lower than the threshold value, the sorting control means 73 controls the sorting means 70 to the open position with the briquette discharge port 34b consequently disconnected from the first branch passage 47A and connected with the second branch passage 47B. The pressure sensor 74 is, when the drive source 46 is employed in the form of a hydraulic cylinder, constituted by a means for detecting a hydraulic pressure such as, for example, a hydraulic back pressure. The pressure sensor 74 may be of a type capable of detecting an urging pressure exerted by the press drive source 45 and converting the detected urging pressure into a pressure. By way of example, a pressure detecting means for detecting a load acting on the pressing member 43 that is driven by the press drive source 45 may be used as the pressure sensor 74.

The press control means 48 shown in FIG. 5 controls the press drive source 45 for the movable pressing member 43 so as to allow the movable pressing member 43 to exert a predetermined pressure and to move at a predetermined compressing speed as will be described subsequently. It is to be noted that the press drive source 46 for plug-type pressing member 44 may be controlled by either the press control means 48 or a independent press control means separate from the press control means 48, or may not be controlled, as to the pressure exerted thereby.

Figure 8:
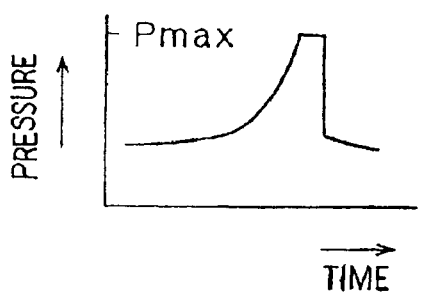
FIG. 8 is a schematic diagram showing a graph of the relationship between the pressure applying time and the pressure.
Figure 9:
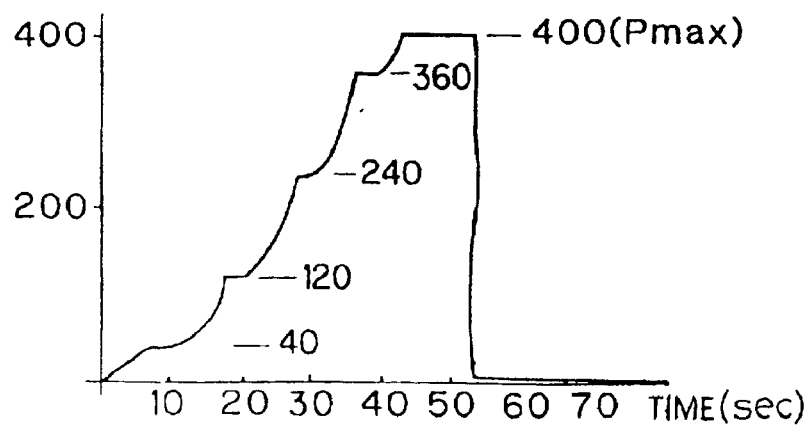
FIG. 9 is a graph showing a specific example of the relationship between the pressure applying time and the pressure.

More specifically, the press control means 48 is of a type capable of controlling the press drive source 45 by monitoring the value of a pressure detected by a pressure detecting means (not shown) that detects the pressure acting on the pressing member 43. The pressure detecting means may be employed in the form of, for example, a load cell. In such case, the press control means 48 performs a control in such a way that as shown in FIG. 8, when the pressure applied by the pressing member 43 attains a target pressure Pmax which may be a value equal to or lower than, for example, 400 MPa, such pressure is maintained for a predetermined length of time, for example, 10 or more seconds and is then removed. Also, the press control means 48 is preferably of a type capable of repeating a number of times an operation to hold a predetermined pressure for a predetermined length of time, for example, 2 to 3 seconds during a course of increase of the pressure for compression as shown in FIG. 9. Yet, the press control means 48 performs a control to progressively decrease the compressing speed.

Figure 10:
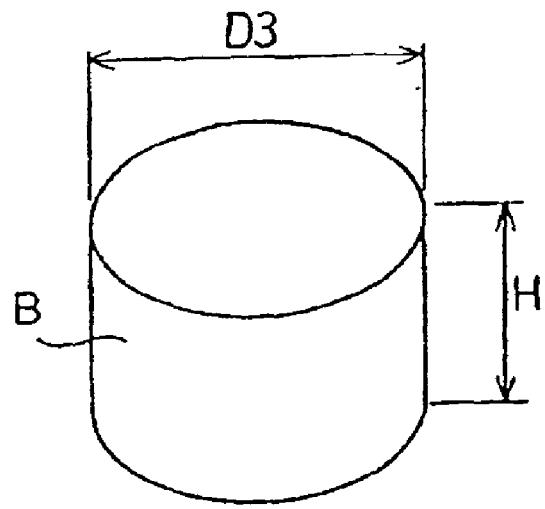
FIG. 10 is a perspective view showing an example of the briquette.

The briquette B so formed is rendered to represent a cylindrical column equal in shape, outer diameter and size to the shape, inner diameter and size of the secondary compressing chamber 34 of the secondary press unit 32. By way of example, as shown in FIG. 10, the briquette B may represent a cylindrical column having a diameter D3 of about 80 mm, a height of about 60 to 70 mm and a weight within the range of 600 to 700 gr.

Figure 11:
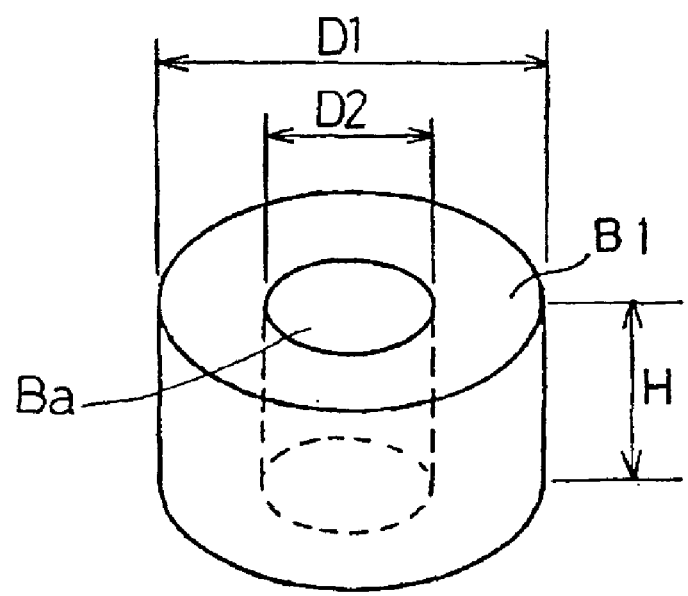
FIG. 11 is a perspective view showing a modified form of the briquette.

It is, however, to be noted that the briquette B may not have such a shape as shown and may have any suitable shape, for example, the shape similar to a cylindrical barrel having a longitudinal hollow as shown in FIG. 11 (i.e., thick-walled tubular shape), a rectangular column or a column having its opposite ends that are spherical.

According to the sludge compressing method or sludge treatment method, the grinding sludge is filtered to such an extent that it contains the coolant in a quantity approximately half of the quantity of the grinding sludge, to thereby provide the concentrated sludge which is subsequently compressed to provide the briquette. Accordingly, a load during compression is small and, also, even the grinding sludge contains an oil-based coolant for hardened iron and steel materials, it can be effectively compressed. Also, since the grinding sludge of a steel material for bearings is employed, the briquette formed by compressing such grinding sludge is a block of grinding scraps of the steel material for bearing which is a high quality steel material and can therefore be used as a high quality material for production of steels. For this purpose, the briquette can be recycled as a steel material.

Also, with the briquetting machine 5 shown in FIG. 5, the grinding sludge which has been filtered to provide the concentrated sludge is pre-compressed by the primary press unit 31 and the pre-compressed sludge is then compressed by the secondary press unit 32 to provide the briquette. Accordingly, whichever the grinding sludge is prepared from hardened component parts or contains an oil-based coolant, it can be effectively and efficiently compressed. Compression of the grinding sludge will not be achieved quickly even though a high pressure is employed and the amount of the coolant cannot be sufficiently reduced because of the viscosity of the coolant and the presence of fine interstices among grinding scraps of the grinding sludge as hereinbefore described. However, the use of the pre-compressing process performed by the primary press unit 31 and the compressing process performed by the secondary press unit 32 is effective to establish compressing conditions appropriate for each of compressing stages so that compression can be performed until the amount of the coolant can be sufficiently reduced, thereby achieving an efficient compression. The primary and secondary press units 31 and 32 can be run simultaneously and the compression can therefore be achieved more efficiently.

The provision of the heating means 40 (FIG. 6) for heating and maintaining the primary press unit 31 to and at a predetermined temperature range is effective and advantageous in that the viscosity of the coolant can be lowered down to a value comparable with that of a water-based coolant depending on the selected temperature to which it is heated and, therefore, the coolant can easily be squeezed during the compression. Since the sludge which has been pre-compressed by and heated in the primary press unit 31 is supplied to the secondary press unit 32, the secondary press unit 32 may not require the provision of a similar heating means and can achieve compression at a high temperature condition. Also, since in the secondary press unit 32, the compression is carried out under a predetermined pressure at a predetermined compressing speed as will be described later, the compression can be carried out more efficiently, making it possible to produce the sold briquette B that is hard to break up.

Because of the reason discussed above, even with the grinding sludge of hardened component parts that are difficult to be compressed or the grinding sludge containing the oil-based coolant, it can be compressed efficiently to provide the solid briquette B that is hard to break up. Since the briquette B is solid and hard as described above, it will not become loose during transportation thereof and can be reused as a material for steel production.

Because the primary press unit 31 is of a vertical type, the space for installation thereof can be minimized and the supply of the sludge B', which has been pre-compressed, onto the secondary press unit 32 can easily be performed by allowing it to fall downwards through the shutter 35 at the lower end thereof. On the other hand, since the secondary press unit 32 is of a transverse type, the coolant squeezed out from the grinding sludge will not stay around the sludge being compressed and will readily flow laterally outwardly. For this reason, drainage of the coolant squeezed can easily be achieved, making it possible to accomplish a more efficient compression of the sludge.

The sludge supply unit 36 (FIG. 5) through which the concentrated sludge is supplied into the primary press unit 31 is of a vertical type which allows the sludge to fall downwardly from the hopper 37 towards the sludge intake port 38 positioned therebelow, a smooth supply of the sludge into the primary press unit 31 can be achieved with a simplified and compact structure.

The pressure and the compressing speed employed by the secondary press unit 32 will now be described. When the pressure under which the compression is carried out attains the target pressure Pmax under the control of a press control means 48 (See FIGS. 8 and 9), such pressure is retained for a predetermined time. This predetermined time during which the pressure is retained is equal to or greater than 10 seconds.

During the pressure being progressively increased for the compression, the press control means 48 repeats a number of times an operation to retain the predetermined pressure for the time. In the example shown in FIG. 9, during a single cycle of pressure application for compression, retention of the compressing pressure including retention of the target pressure Pmax is carried out five times. The predetermined time during which the pressure retention is carried out in the course of the pressure application is chosen to be within the range of, for example, 2 to 3 seconds. The compressing speed is slowly decreased.

Specific numeric values of the compressing speed and the pressure during the pressure retention will be enumerated by way of example. The compressing speed may be 6.5 cm/sec for the first stage, 6.1 cm/sec for the second stage, 5.7 cm/sec for the third stage, and 4.8 cm/sec for the fourth stage. The pressure used to change the compressing speed (the pressure to be retained temporarily) may be 40 MPa at the first time, 120 MPa at the second time, 240 MPa at the third time, and 360 MPa at the fourth time. The maximum pressure (the target pressure Pmax) is chosen to be 400 MPa.

Because of the viscosity of the coolant, bleeding of the coolant from the sludge being compressed tends to delay the compressing operation. Particularly in the case of the oil-based coolant having a high viscosity, a considerable delay occurs in bleeding. For this reason, during the course in which the pressure is progressively increased, by repeating retention of the pressure for the predetermined time and increase of the pressure, the viscous coolant can be effectively and efficiently squeezed while being compressed, without the concentrated sludge, which has been conditioned to be easily compressed with curly grinding scraps or ground chips entangled together, being decomposed into a slurry. The briquette so produced can exhibit a low content of the coolant.

The reason that the maximum value of the pressure for compression is chosen to be a value equal to or lower than 400 MPa is that, as a result of a series of experiments, the use of the pressure of a value higher than 400 MPa during the compression will not bring about reduction of the content of the coolant in the briquette and increase of the strength and the use of the pressure of MPa has been found effective to provide the briquette having an appropriate content of the coolant in the briquette and a sufficient strength.

Figure 12:
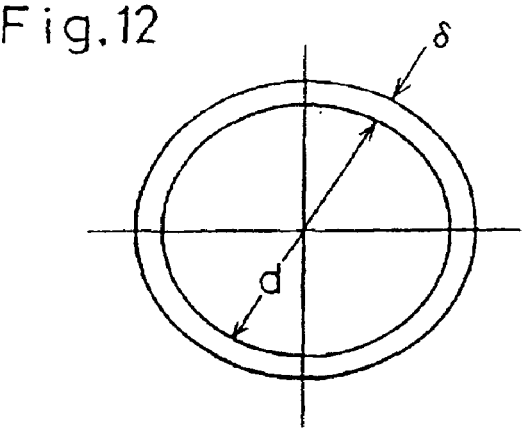
FIG. 12 is an explanatory diagram showing a model used to study a process of squeezing a coolant.

The effect of heating of the grinding sludge performed by the heating means 40 in the primary press unit 31 will now be described. Consideration is first be made in connection with a process of squeezing the oil-based coolant from the grinding sludge. In this connection, a process in which the coolant squeezed from the grinding sludge flows to the outside of the compressing chamber will be considered. Considering the flow in a space inside an annular gap shown in FIG. 12, the mass flow Q can be expressed by the following equation:

$$Q = [\pi d(p1-p2)\delta^3]/(12 \mu L) \quad (1)$$

wherein:
d: Axle Diameter
δ: Gap
μ: Coefficient of viscosity
L: Length (Length of Axle engaged with Cylinder Inner Surface)
(p1–p2): Pressure Difference Taking the briquetting machine shown in FIG. 5 into consideration, the axle diameter d referred to above represents the diameter of each of the pressing members 43 and 44 of the secondary press unit 32, and the gap δ referred to above corresponds to a gap delimited between an inner peripheral surface of the secondary compressing chamber 34 which is a cylinder chamber, and the compressing members 43 and 44.

The equation (1) above clearly suggests that in order to increase the performance of compression of the sludge containing the oil-based coolant one or some of the gap δ, the length L and the viscosity μ have to be modified.

While the gap δ is affected by the third power, the cylinder inner diameter and the axle diameter have to be machined to a severe tolerance. However, since the gap is considered closely associated with blow of the sludge, it is necessary to set up an appropriate gap by conducting tests.

The length L is preferred to be as small as possible, but since the length L is also considered closely associated with blow of the sludge, tests have to be conducted to set up an appropriate relationship between the length and the gap.

The lower the viscosity μ, the higher the flow, and therefore, the compressing process is preferred to be performed under a condition in which the viscosity is low. Also, the equation (1) above shows the mass flow exhibited when the squeezed coolant bleeds out of the compressing chamber, but the viscosity μ poses a resistance to the flow of the coolant as it passes through interstices among the ground chips within the sludge. Accordingly, the lower the viscosity μ, the better.

Figure 13:
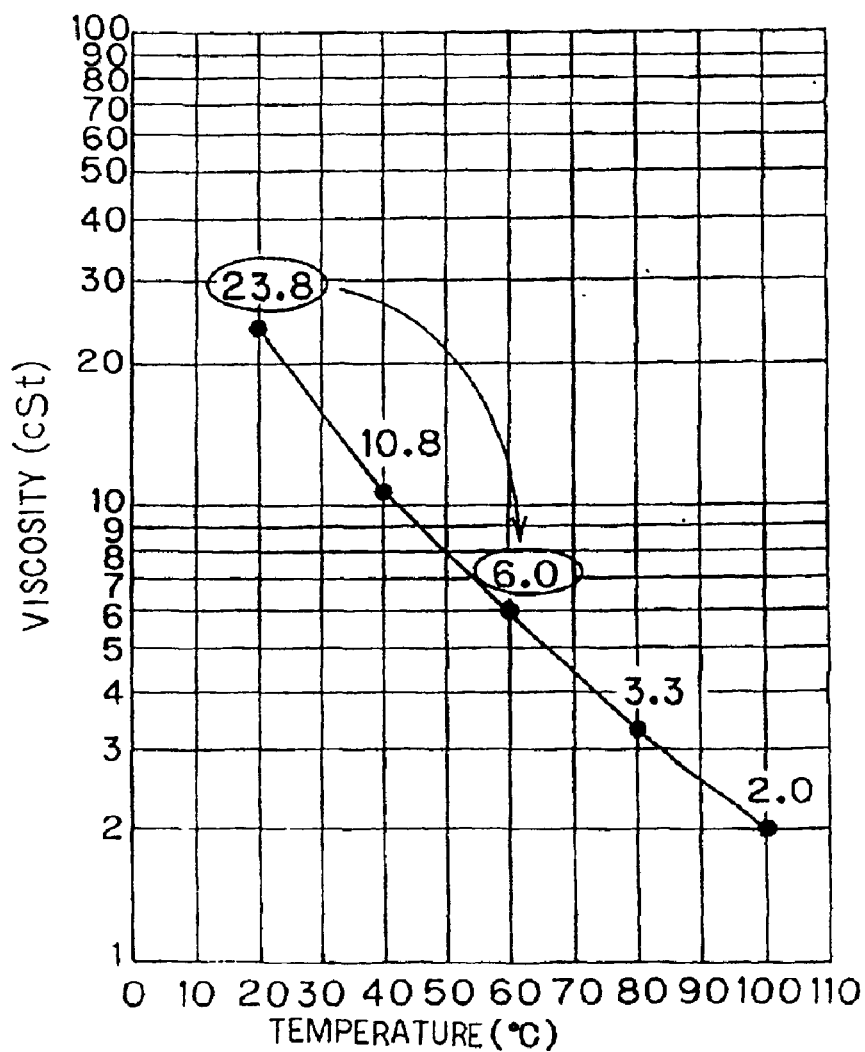
FIG. 13 is a graph showing the relationship between the temperature and the viscosity of the coolant.

FIG. 13 illustrates a graph showing the relationship between the temperature and the viscosity of the oil-based coolant.

According to the graph shown in FIG. 13, it will readily be understood that increase of the temperature of the coolant from 20° C., which is normal temperatures of the coolant, to 60° C. results in reduction of the viscosity down to about ¼ of that at the time the coolant is at the normal temperatures. For this reason, it will also readily be seen that increase of the temperature of the grinding sludge containing that coolant to about 60° C. is effective to markedly shorten the length of time required to accomplish the compressing process. It is, however, to be noted that if the temperature of the grinding sludge exceeds 60° C., the temperature of the machine will be too high for the attendant worker to perform servicing during the run of the machine, along with a risk of fire or any adverse influence on the surroundings. On the other hand, if the temperature of the grinding sludge is lower than 20° C. that is close to the normal temperatures, reduction of the viscosity performed by heating will be insufficient. As such, the temperature to which the sludge is heated and maintained is preferably within the range of 20 to 60° C.

Figure 14:
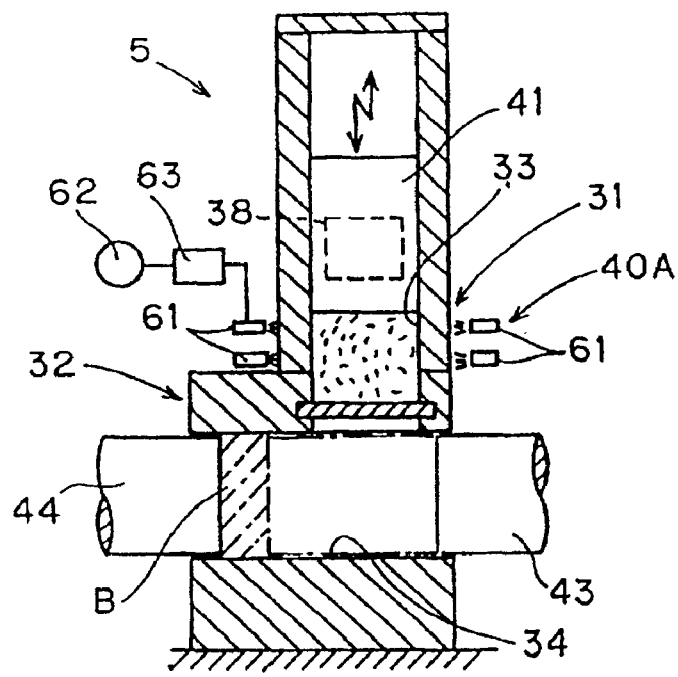
FIG. 14 is a sectional view showing the briquetting machine according to another preferred embodiment of the present invention.

It is to be noted that although in the foregoing embodiment the heating means 40 used in the primary press unit 31 is employed in the form of an electric heater, the heating means that can be employed in the practice of the present invention may be comprised of a hot air blower 40A for blowing a hot air to the primary press unit 31 as shown in FIG. 14. This hot air blower 40A may include a plurality of nozzles 61 arranged adjacent an outer periphery of the primary press unit 31, a blower 62 for supplying an air current to the nozzles 61 and a air heating heater 63 for heating the air current.

Figure 15:
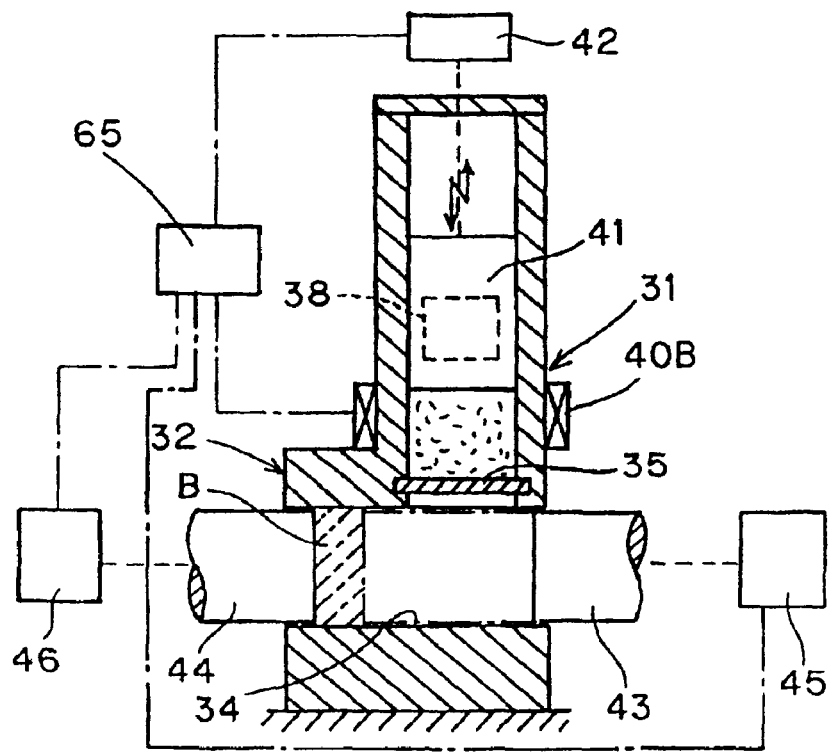
FIG. 15 is a sectional view showing the briquetting machine according to a further preferred embodiment of the present invention.

The heating means may be comprised of a recirculating passage 40B provided in the primary press unit 31 for the flow of a heating medium therethrough, as shown in FIG. 15. The recirculating passage 40B may be of either a jacket type or a piping type. The heating medium used in the recirculating passage 40B may be either an oil or a hot water or the like. Means for heating the heating medium used in the recirculating medium 40B may be waste heat produced from a forced cooling device 65 that is, where the press drive sources 42, 45 and 46 employed are of a hydraulic type, used to forcibly cool a working fluid for each of the hydraulic press drive sources 42, 45 and 46. In such case, the forced cooling device 65 may be alternately started and halted so that the temperature of the oil can be controlled to a predetermined value and the working oil as a heat source can be circulated within the recirculating passage 40B. The working fluid used in the press drive sources 42, 45 and 46 may be directly used as a heat medium to be used in the recirculating passage 40B or may be used to exchange heat with a different heating medium so that the heat-exchanged heating medium can flow through the recirculating passage 40B. A press drive source that utilizes the waste heat may be one, two or all of the press drive source 42 of the primary press unit 31 and the press drive sources 45 and 46 of the secondary press unit 32.

Figure 16:
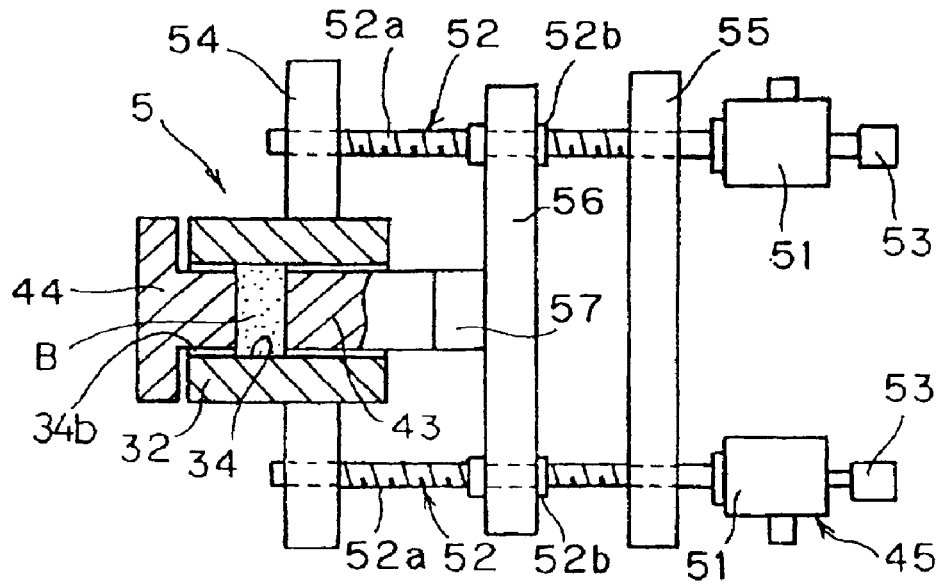
FIG. 16 is a fragmentary sectional view, on an enlarged scale, of the briquetting machine shown in FIG. 15.

FIG. 16 illustrates the details of the press drive source 45 for the pressing member 43 in the secondary press unit 32. Of the pressing members 43 and 44, the pressing member 43 is a movable working member capable of being advanced towards the advanced position adjacent the plug-type pressing member 44 to apply a pressure to the pre-compressed sludge to compress the latter. The plug-type pressing member 44 is a plug member that is held at a closing position to close the briquette discharge port 34b during compression of the pre-compressed sludge B performed by the pressing member 43, but is retracted towards an open position to open the briquette discharge port 34b at the time the briquette B is to be discharged onto the briquette transport path 47.

Of them, the press drive source 45 for selectively advancing and retracting the movable pressing members 43 is of a design wherein the movable pressing member 43 can be selectively advanced and retracted by a plurality of electric motors 51 through associated ball screws 52. The number of the ball screws 52 that can be employed may be, for example, within the range of two to four and are disposed parallel to each other so that the pressing members 43 can be advanced or retracted by the associated electric motors 51.

Each of the electric motors 51 may be a servo drive motor and is equipped with a corresponding encoder 53 for detecting the number of revolutions of the respective electric motor 51. Each of the ball screws 52 has a screw shaft 52 has its opposite ends supported by corresponding support members 54 and 55 that are secured to a housing defining the secondary compressing chamber 34 of the secondary press unit 32 or a frame structure supporting such housing although not shown.

The pressing member 43 is coupled with a movable member 56 provided with nuts 52b of the respective ball screws 52. The movable member 56 is provided with an applied pressure detecting means 57 such as, for example, a load cell for detecting an applied pressure. In the illustrated instance, the applied pressure detecting means 57 is interposed between the pressing member 43 and the movable member 56.

It is to be noted that the press drive source 45 for the movable pressing member 43 may, instead of the combination of the electric motors 51 and the ball screws 52, be employed in the form of one or more hydraulic cylinders. Where the hydraulic cylinder or cylinders are employed for the press drive source 45, control valves such as, for example, servo valves (not shown) are to be employed in a hydraulic circuit. The press drive source 46 for the plug-type pressing member 44 is employed in the form of a hydraulic cylinder.

The press control means 48 shown in FIG. 5 is used to control the press drive source 45 for the movable pressing member 43 so as to allow the latter to apply a predetermined pressure at a predetermined compressing speed. Where the press drive source 45 comprises the electric motors 51 shown in FIG. 16 as hereinbefore described, the pressure is controlled by means of a torque control or an electric current control and the compressing speed is controlled by controlling a rotational speed. It is to be noted that the press drive source 46 for the plug-type pressing member 44 may be of a design in which a pressure control is carried out by the press control means 48 or of a design in which no pressure control is carried out.

More specifically, the press control means 48 is operable to monitor the pressure detected by the applied pressure detecting means 57 to control the press drive source 45. In such case, the press control means 48 operates in the manner described before with reference to FIGS. 8 and 9.

The press drive source 45 employed in the illustrated embodiment is of a type capable of driving the movable pressing member 43 by the electric motors 51 through the ball screws 52 and, therefore, a desired control line can easily be obtained to efficiently produce the briquettes. In other words, the press drive source 45 for the secondary press unit 32 may be employed in the form of a hydraulic cylinder, but the hydraulic cylinder is generally inefficient due to a loss resulting from heat dissipation and difficult to control. Accordingly, such a problem will not occur where the combination of the electric motors 51 and the ball screws 52 are employed for the press drive source 45.

It is to be noted that although in the description of the illustrated embodiment the primary press unit 31 has been employed, the use of the primary press unit 31 is not always necessary and may therefore be dispensed with.

The shape of the briquette produced in accordance with the present invention will now be described. The briquette is formed by compressing the grinding sludge containing the oil-based coolant that is generated in the grinding line for treating hardened component parts in the manner hereinbefore described and is available in various shapes, for example, a cylindrical column shown by B in FIG. 10 or a thick-walled tubular column shown by B1 in FIG. 11 and having a cylindrical hollow Ba defined therein. The cylindrical hollow Ba of the thin-walled tubular briquette B1 extends completely across the length of the thin-walled tubular briquette B1. The ratio of the inner diameter D2 of the cylindrical hollow Ba relative to the outer diameter D1 of the briquette B1 is, for example, D2/D1=0.40 to 0.60. The ratio of the height H of the briquette B1 relative to the outer diameter D1 thereof is, for example, H/D1=0.5 to 1.0.

With the briquette B1 of the structure described above, the presence of the cylindrical hollow Ba therein is effective, as compared with the solid cylindrical briquette, to provide increased inner and outer circumferences which serves as a surface area for drainage of oil with no need to increase the cross sectional surface area thereof which would affect a surface pressure during compression, thereby facilitating squeezing of the coolant during the manufacture using the compression process. In particular, since the cylindrical hollow Ba is in the form of a throughhole, the inner and outer circumferences thereof can be increased even though the cross sectional surface area thereof remains the same (and, hence, the respective surface pressures remain the same during the compression). For this reason, even with the grinding sludge containing the oil-based coolant, it can easily be compressed by squeezing and, even without a drainage passage used, the coolant can be drained efficiently. Also, even with the grinding sludge of hard and fine ground chips resulting from a hardened component part, the coolant can easily be squeezed and, therefore, the compression can easily be achieved. Because of these features, the briquette robust and hard to break up can be obtained.

Where the briquette B1 is made to represent a thick-walled hollow cylinder as shown in FIG. 11, the inner and outer circumferences thereof will take the following power, which varies depending on the outer and inner diameters D1 and D2 thereof, relative to those of the solid cylindrical briquette of FIG. 10 having the same volume (capacity) as that of the briquette B1. Numerical values tabulated in Table 1 below are those calculated when the outer diameter D1 of the thick-walled hollow cylindrical briquette B1 is varied while the solid cylindrical briquette B has a diameter D3 of 80 mm. Both of those briquettes B and B1 have a height of 50 mm.

The relationship in cross sectional surface area is expressed by the following equation:

$$(\pi \times D3 \times D3)/4 = (\pi \times D1 \times D1 - \pi \times D2 \times D2)/4$$

The ratio between the inner and outer circumferences is expressed by the following formula:

$$[\pi \times (D1 + D2)]/(\pi \times D3)$$

TABLE 1

| Outer Dia. D1 | Inner Dia. D2 | D2/D1 | Inner · Outer Circumference Ratio |
|---|---|---|---|
| 80 | 0.00 | 0.00 | 1.00 |
| 82 | 18.00 | 0.21 | 1.25 |
| 84 | 25.61 | 0.30 | 1.37 |
| 86 | 31.56 | 0.37 | 1.47 |
| 88 | 36.66 | 0.42 | 1.56 |
| 90 | 41.23 | 0.46 | 1.64 |
| 92 | 45.43 | 0.49 | 1.72 |
| 94 | 49.36 | 0.53 | 1.79 |
| 96 | 53.07 | 0.55 | 1.86 |
| 98 | 56.60 | 0.58 | 1.93 |
| 100 | 60.00 | 0.60 | 2.00 |

As can readily be understood from Table 1 above, as the ratio of the inner diameter D2 of the cylindrical hollow Ba relative to the outer diameter D1 of the briquette B1 increases, the inner and outer circumferences increase correspondingly, but in order to maintain the same volume the outer diameter D1 increases accordingly, and increase of the outer diameter D1 of the briquette B1 tends to pose a problem associated with the briquetting machine increasing in size. Also, as the outer diameter D1 of the briquette B1 increases, the inner diameter D2 increases accordingly, and the wall thickness between the inner and outer peripheral surfaces of the briquette B1 decreases correspondingly. When this ratio D2/D1 exceeds 0.60, a problem would arise in that because of the wall thickness decreased, the briquette B1 is susceptible to breakage. If this ratio is small, an effect brought about by increase of the surface area is insufficient, but if this ratio is smaller than 0.4, the presence of the cylindrical hollow Ba in the briquette B1 will no longer work to facilitate squeeze of the coolant. Accordingly, the ratio referred to above, that is, D2/D1 is preferably within the range of 0.40 to 0.60, and accordingly, by way of example, the outer and inner diameters D1 and D2 are preferably chosen to be 100 mm and 60 mm, respectively.

Figure 17:
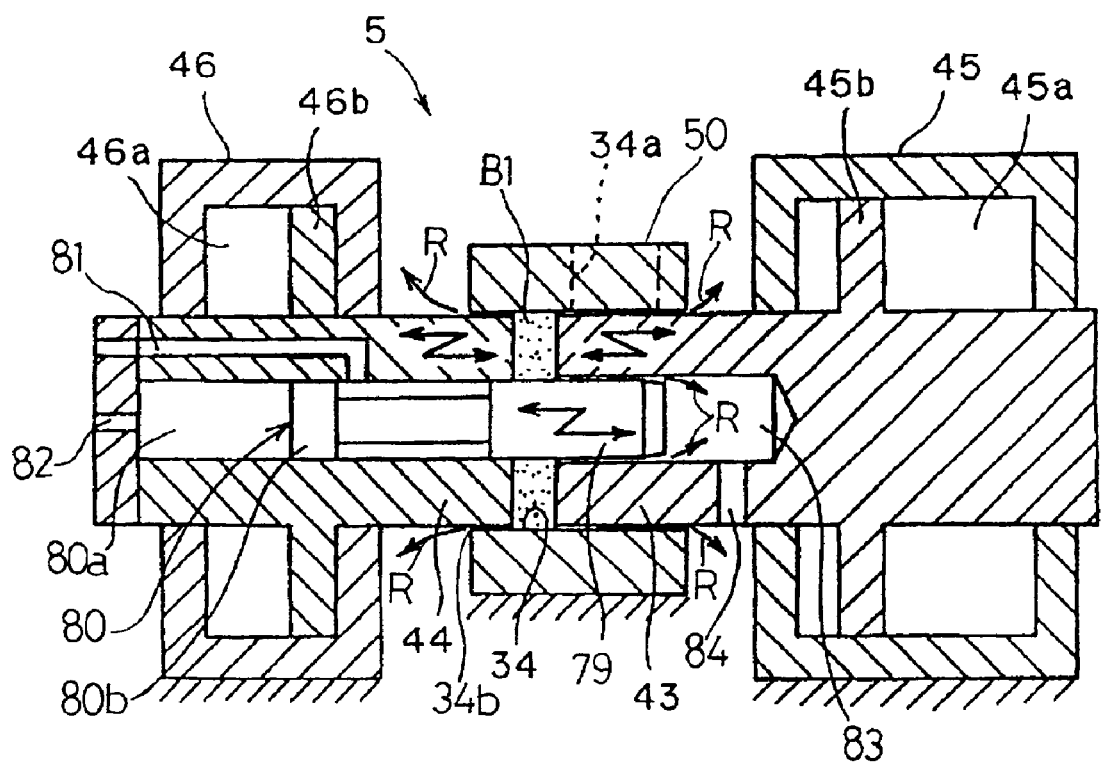
FIG. 17 is a sectional view of the briquetting machine.
Figure 18:
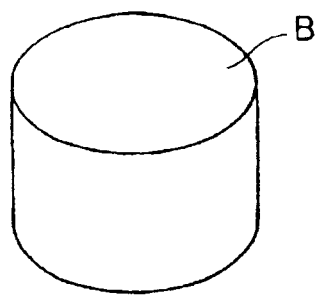
FIG. 18 is a perspective view of the prior art briquetting machine.
Figure 19:
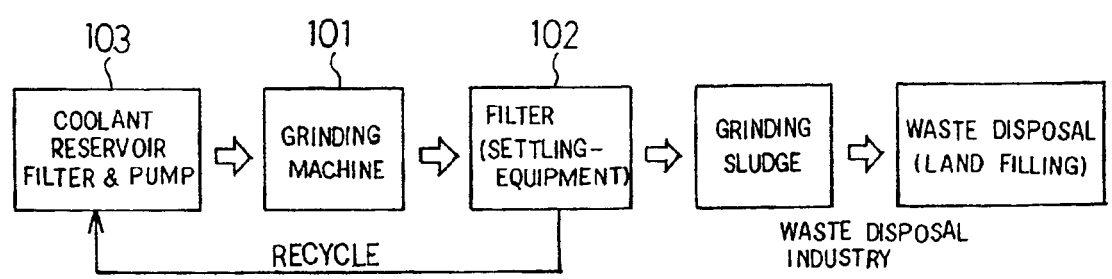
FIG. 19 is a block diagram showing the prior art process of treating a grinding sludge.

FIG. 17 illustrates a sectional representation, on an enlarged scale, of the briquetting machine 5, particularly that of the secondary press unit 32 thereof. The briquetting machine 5 includes the cylindrical compressing chamber 34 within which the pressing members 43 and 44 are accommodated for movement close towards and away from each other. The peripheral wall 50 of the briquetting machine 5 defining the compressing chamber 34 is formed with the receiving port 34a for receiving the grinding sludge. The grinding sludge supplied into the compressing chamber 34 through the receiving port 34a is compressed by and between the pressing members 43 and 44 as shown at a location axially displaced from the receiving port 34a to thereby provide the briquette B1. The pressing members 43 and 44 are driven by the respective press drive sources 45 and 46. Each of the press drive sources 45 and 46 may be a hydraulic cylinder including a piston 45b or 46b movably accommodated within a cylinder chamber 45a or 46a.

One of the pressing members, that is, the pressing member 44 provided with a retractable mandrel 79 that is retractable from a center of one end face thereof which serves as a pressure applying end face, which mandrel 79 is driven by a mandrel drive source 80 for movement between advanced and retracted positions in a direction axially thereof. The mandrel drive source 80 is employed in the form of a hydraulic cylinder including a cylinder chamber 80a, defined in the pressing member 44, and a piston 80b movably accommodated within the cylinder chamber 80a. Opposite end portions of the cylinder chamber 80a on respective sides of the piston 80b within the cylinder chamber 80a are fluid connected with a hydraulic fluid supply and discharge means (not shown) through respective fluid passages 81 and 82. The pressing member 43 axially confronting the pressing member 44 provided with the retractable mandrel 79 is formed with an escape hole 83, defined in an end face thereof which serves as a pressure applying end face of the pressing member 43, for receiving the mandrel 79 when the latter is driven to the advanced position. This escape hole 83 is in turn communicated with the outside through a coolant drain port 84.

The grinding sludge that is compressed within the compressing chamber 34 is compressed to provide the thick-walled hollow cylindrical briquette B1 when the grinding sludge is compressed by and between the pressing members 43 and 44 with the mandrel 79 extending through a center as shown in the figure so as to define the cylindrical hollow in the eventually formed briquette B1. The coolant squeezed from the grinding sludge during the compression is, as shown by the arrows R, discharged through a gap between the inner peripheral surface of the compressing chamber 34 and the respective outer peripheral surfaces of the pressing members 43 and 44 and also through a gap between the mandrel 79 and an inner peripheral surface of the escape hole 83.

The briquette B1 so formed can be purged from the compressing chamber 34 when the pressing member 44 is moved to the retracted position while the pressing member 43 is advanced.

It is to be noted that in the foregoing description the machine shown in FIG. 17 has been described as the secondary press unit 32 used in the briquetting machine 5 shown in FIG. 6. However, the machine shown in FIG. 17 may be an independent briquetting machine in its entirety regardless of whether or not it is the secondary pressing unit 32. In such case, the grinding sludge may be compressed without being pre-compressed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of providing a compressed solid material, the method comprising the operations of:
   filtering a grinding sludge to provide a concentrated sludge, the grinding sludge resulting from machining of a hardened steel material and containing an oil-based coolant;
   in a first compressing operation, pre-compressing the concentrated sludge in a first press unit; and
   in a second compressing operation, compressing the pre-compressed sludge in a second press unit by squeezing to provide the compressed solid material.

2. The method of providing the compressed solid material as claimed in claim 1, wherein the grinding sludge before being filtered is a fluid medium containing the coolant in a quantity equal to or greater than 90 wt %.

3. The method of providing the compressed solid material as claimed in claim 1, wherein the compressed solid material formed by the compressing contains the coolant in a quantity within the range of 5 to 10 wt %.

4. The method of providing the compressed solid material as claimed in claim 1, wherein the filtering comprises:
   pressurizing and guiding the grinding sludge towards a filtering belt, which filters coolant from the grinding sludge; and
   subjecting the grinding sludge to compressed air, to further filter coolant from the grinding sludge.

5. The method of providing the compressed solid material as claimed in claim 1, wherein if a plurality of kinds of coolant are used in a grinding line, where the grinding sludge is created, the grinding line comprises at least one processing line for each kind of coolant, and the filtering and the compressing are performed for each processing line in a paralleling fashion.

6. The method of providing the compressed solid material as claimed in claim 1, wherein the steel material is component parts of a rolling bearing.

7. The method of compressing the grinding sludge as claimed in claim 1, wherein the concentrated sludge, before being compressed, is a fluid medium containing the coolant in a quantity approximately 50 wt %.

8. An apparatus making a compressed solid material by compressing a grinding sludge containing a coolant, which sludge is produced in a grinding line grinding hardened component parts, by filtering the grinding sludge to provide a concentrated sludge which is subsequently compressed by squeezing to provide a compressed solid material, the apparatus comprising:
   a primary press unit, connected with the grinding line, accommodating a predetermined quantity of the concentrated sludge, and pre-compressing the concentrated sludge that has been accommodated; and
   a secondary press unit compressing the pre-compressed sludge under a predetermined pressure to thereby provide the compressed solid material,
   wherein said primary press unit is coupled to said secondary press unit through a passage through which said pre-compressed sludge passes.

9. The apparatus as claimed in claim 8, further comprising a heater heating the primary press unit to, and maintaining the primary press unit at a predetermined temperature range.

10. The apparatus as claimed in claim 8, further comprising a press controller controlling a pressing work used for squeezing in the secondary press unit to a predetermined pressure, and a predetermined compressing speed.

11. The apparatus as claimed in claim 8, wherein the coolant contained in the grinding sludge is an oil-based coolant.

12. The apparatus as claimed in claim 8, wherein the hardened component parts are those of a rolling bearing.

13. The apparatus as claimed in claim 9, wherein the heater comprises a heater disposed in the primary press unit.

14. The apparatus as claimed in claim 9, wherein the heater comprises a hot air blower blowing a hot air to the primary press unit.

15. The apparatus as claimed in claim 9, wherein the predetermined temperature range to, and at which, the concentrated sludge within the primary press unit is heated and maintained, is from 20 to 60° C.

16. The apparatus as claimed in claim 8, wherein the coolant is oil-based and of a paraffin type.

17. The apparatus as claimed in claim 8, wherein the primary press unit is a vertical press having a primary compressing chamber within which the sludge is downwardly compressed.

18. The apparatus as claimed in claim 8, wherein the hardened component parts are ferrous component parts of a rolling bearing.

19. An apparatus, making a compressed solid material by compressing a grinding sludge containing a coolant, which sludge is produced in a grinding line grinding hardened component parts, by filtering the grinding sludge to provide a concentrated sludge which is subsequently compressed by squeezing to provide a compressed solid material, the apparatus comprising:
 a primary press unit, connected with the grinding line, accommodating a predetermined quantity of the concentrated sludge, and pre-compressing the concentrated sludge that has been accommodated; and
 a secondary press unit, connected with the primary press unit and compressing the pre-compressed sludge under a predetermined pressure to thereby provide the compressed solid material,
 wherein the primary press unit is a vertical press having a primary compressing chamber in which the concentrated sludge is pre-compressed in a downward direction and includes a shutter defined at a lower end thereof for discharge of the pre-compressed sludge and wherein the secondary press unit is a transverse press including a secondary compressing chamber having a portion positioned immediately below the shutter receiving the pre-compressed sludge by way of the shutter.

20. An apparatus, making a compressed solid material by compressing a grinding sludge containing a coolant, which sludge is produced in a grinding line grinding hardened component parts, by filtering the grinding sludge to provide a concentrated sludge which is subsequently compressed by squeezing to provide a compressed solid material, the apparatus comprising:
 a primary press unit, connected with the grinding line, accommodating a predetermined quantity of the concentrated sludge and pre-compressing the concentrated sludge that has been accommodated;
 a secondary press unit, connected with the primary press unit and compressing the pre-compressed sludge under a predetermined pressure to thereby provide the compressed solid material; and
 a sludge supply unit positioned above the primary press unit supplying the concentrated sludge into the primary compressing chamber, said sludge supply unit being a vertical type sludge supply unit including a hopper through which the concentrated sludge is allowed to fall by gravity into the primary compressing chamber through a sludge receiving port of the primary press unit positioned below the hopper.

21. An apparatus, making a compressed solid material by compressing a grinding sludge containing a coolant, which sludge is produced in a grinding line grinding hardened component parts, by filtering the grinding sludge to provide a concentrated sludge which is subsequently compressed by squeezing to provide a compressed solid material, the apparatus comprising:
 a primary press unit, connected with the grinding line, accommodating a predetermined quantity of the concentrated sludge and pre-compressing the concentrated sludge that has been accommodated; and
 a secondary press unit, connected with the primary press unit and compressing the pre-compressed sludge under a predetermined pressure to thereby provide the compressed solid material,
 wherein the secondary press unit has a discharge port defined therein to discharge the compressed solid material, and further comprising a transport path following the discharge port, said transport path being divided into two paths, and a sorter selectively switching the compressed solid material, discharged from the discharge port, onto one of the two paths.

22. The apparatus as claimed in claim 21, further comprising:
 a pressure sensor provided in the secondary unit; and
 a sorting controller, connected with the secondary press unit and controlling a switching operation of the sorter by comparing a pressure detected by the pressure sensor with a threshold value.

23. An apparatus making a compressed solid material by compressing a grinding sludge containing a coolant, which sludge is produced in a grinding line grinding hardened component parts, by filtering the grinding sludge to provide a concentrated sludge, which is subsequently compressed by squeezing, to provide a compressed solid material, the apparatus comprising:
 a first press unit, connected with the grinding line and coupled to a second press unit through a passage, where at least one of the first and second press units has a compressing chamber defined therein compressing the concentrated sludge within the compressing chamber, to thereby provide the compressed solid material; and
 a press controller controlling
  a pressure in the at least one first and second press units used to squeeze to a predetermined pressure, and
  a predetermined compressing speed.

24. The apparatus as claimed in claim 23, wherein the press controller is operable to retain the pressure for a predetermined time when the pressure applied attains a target pressure.

25. The apparatus as claimed in claim 24, wherein the predetermined time during which the pressure is retained is equal to or greater than 10 seconds.

26. The apparatus as claimed in claim 24, wherein the press controller repeatedly performs an operation to retain the predetermined pressure for the predetermined length of time a number of times during a period in which the pressure used to squeeze is progressively increased.

27. The apparatus as claimed in claim 26, wherein the predetermined time over which the pressure is retained during the period in which the pressure is progressively increased is within the range of 2 to 3 seconds.

28. The apparatus as claimed in claim 23, wherein the press controller is operable to slowly reduce the compressing speed.

29. The apparatus as claimed in claim 23, wherein the press controller applies the pressure to squeeze up to approximately 400 MPa.

30. The apparatus as claimed in claim 23, wherein the second press unit have a pressing member using a ball screw mechanism driven by an electric motor.

31. The apparatus as claimed in claim 23, wherein the hardened component parts are ferrous component parts of a rolling bearing.

32. The apparatus as claimed in claim 23, wherein the coolant is an oil-based coolant.

33. An apparatus for making a compressed solid material, comprising:

a primary press unit, receiving a sludge concentrated by filtering, accommodating a predetermined quantity of the concentrated sludge, and pre-compressing the concentrated sludge that has been accommodated, the sludge containing a coolant and being produced by machining of hardened steel; and a secondary press unit, connected with the primary press unit via a passage through which the pre-compressed sludge passes, and compressing the pre-compressed sludge under a predetermined pressure to provide the compressed solid material.

34. An apparatus for making a compressed solid material, comprising:

a primary press unit, receiving a sludge concentrated by filtering, accommodating a predetermined quantity of the concentrated sludge, and compressing the accommodated, concentrated sludge under a first predetermined pressure, the sludge containing a coolant and being produced by machining of hardened steel; and a secondary press unit, connected with the primary press unit, receiving the sludge compressed by the primary press unit via a passage, and compressing the sludge under a second predetermined pressure to provide the compressed solid material.

* * * * *